US011415560B2

(12) United States Patent
Kaneda

(10) Patent No.: US 11,415,560 B2
(45) Date of Patent: Aug. 16, 2022

(54) BACKING MEMBER AND ULTRASONIC PROBE

(71) Applicant: SHINKO ELECTRIC INDUSTRIES CO., LTD., Nagano (JP)

(72) Inventor: Hisashi Kaneda, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 0 days.

(21) Appl. No.: 17/019,545

(22) Filed: Sep. 14, 2020

(65) Prior Publication Data

US 2021/0088479 A1 Mar. 25, 2021

(30) Foreign Application Priority Data

Sep. 19, 2019 (JP) ............................ JP2019-170747

(51) Int. Cl.
*G01N 29/24* (2006.01)

(52) U.S. Cl.
CPC ................................ *G01N 29/2437* (2013.01)

(58) Field of Classification Search
CPC G01N 29/2437; B06B 1/0681; B06B 1/0685; G10K 11/002
USPC ........................................................... 73/654
See application file for complete search history.

(56) References Cited

U.S. PATENT DOCUMENTS

| | | | | |
|---|---|---|---|---|
| 2,881,336 | A * | 4/1959 | Elion | G10K 11/165 310/327 |
| 5,267,221 | A | 11/1993 | Miller et al. | |
| 5,592,730 | A * | 1/1997 | Greenstein | B06B 1/0622 29/25.35 |
| 10,516,090 | B2 | 12/2019 | Sorimachi | |
| 2017/0326592 | A1 * | 11/2017 | Fiseni | H05K 3/32 |
| 2017/0338398 | A1 * | 11/2017 | Sorimachi | H01L 41/0475 |

FOREIGN PATENT DOCUMENTS

| | | | |
|---|---|---|---|
| JP | 2002257896 | A * | 9/2002 |
| JP | 2017-208772 | | 11/2017 |

OTHER PUBLICATIONS

Extended European search report dated Feb. 11, 2021 issued with respect to the corresponding European patent application No. 20196522.5.

* cited by examiner

*Primary Examiner* — Tarun Sinha
(74) *Attorney, Agent, or Firm* — IPUSA, PLLC

(57) ABSTRACT

A backing member includes a resin layer having a first surface, and a second surface opposite to the first surface, and a plurality of linear conductors, embedded in the resin layer, and penetrating the resin layer from the first surface to the second surface. Each of the plurality of linear conductors includes a metal material having an ultrasonic wave insulating property, and includes at least one bent portion or curved portion.

18 Claims, 19 Drawing Sheets

BACKING MEMBER AND ULTRASONIC PROBE

CROSS-REFERENCE TO RELATED APPLICATION

This application is based upon and claims priority to Japanese Patent Application No. 2019-170747, filed on Sep. 19, 2019, the entire contents of which are incorporated herein by reference.

FIELD

Certain aspects of the embodiments discussed herein are related to a backing member and an ultrasonic probe.

BACKGROUND

Conventionally, an ultrasonic diagnostic apparatus performs a diagnosis of an object by visualizing the inside of the object using an ultrasonic wave. The ultrasonic diagnosis apparatus includes an ultrasonic probe that transmits and receives the ultrasonic wave. When performing the diagnosis, the ultrasonic wave is generated while causing the ultrasonic probe to make contact with the object, and reflected ultrasonic wave is received and processed as image data, to visualize a state inside the object.

In the ultrasonic probe, the ultrasonic wave is transmitted by a piezoelectric element, and a backing member for absorbing the ultrasonic wave propagating toward a rear of the ultrasonic probe is arranged below the piezoelectric element. The backing member includes a resin layer, and leads embedded in the resin layer. In order to reduce noise in the ultrasonic wave transmitted from the piezoelectric element, the resin layer includes, as a filler, a material such as tungsten or the like, having an effect of effectively insulating the noise with respect to the ultrasonic wave, as described in Japanese Laid-Open Patent Publication No. 2017-208772, for example.

However, in the case where the leads are embedded in the resin layer of the backing member, the filler may not be dispersed uniformly or may deposit at a bottom portion of the resin layer when manufacturing the backing member, and cause an unwanted conduction between the filler and the leads. For this reason, the amount of filler that may be added to the resin layer is limited, which may be insufficient to reduce the noise in the ultrasonic wave transmitted from the piezoelectric element.

Accordingly, in order to reduce the noise in the ultrasonic wave transmitted from the piezoelectric element, there are demands for new measures, which may be employed in place of the conventional measures that include the filler within the resin layer, or in addition to the conventional measures that include the filler within the resin layer.

SUMMARY

Accordingly, it is an object in one aspect of the embodiments to provide a backing member and an ultrasonic probe, which can reduce noise in an ultrasonic wave transmitted from a piezoelectric element.

According to one aspect of the embodiments, a backing member includes a resin layer having a first surface, and a second surface opposite to the first surface; and a plurality of linear conductors, embedded in the resin layer, and penetrating the resin layer from the first surface to the second surface, wherein each of the plurality of linear conductors includes a metal material having an ultrasonic wave insulating property, and wherein each of the plurality of linear conductors includes at least one bent portion or curved portion.

According to another aspect of the embodiments, an ultrasonic probe includes the backing member described above; a piezoelectric element, arranged on the backing member, and electrically connected to each of the plurality of linear conductors; and an acoustic adjustment layer arranged on the piezoelectric element.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1:
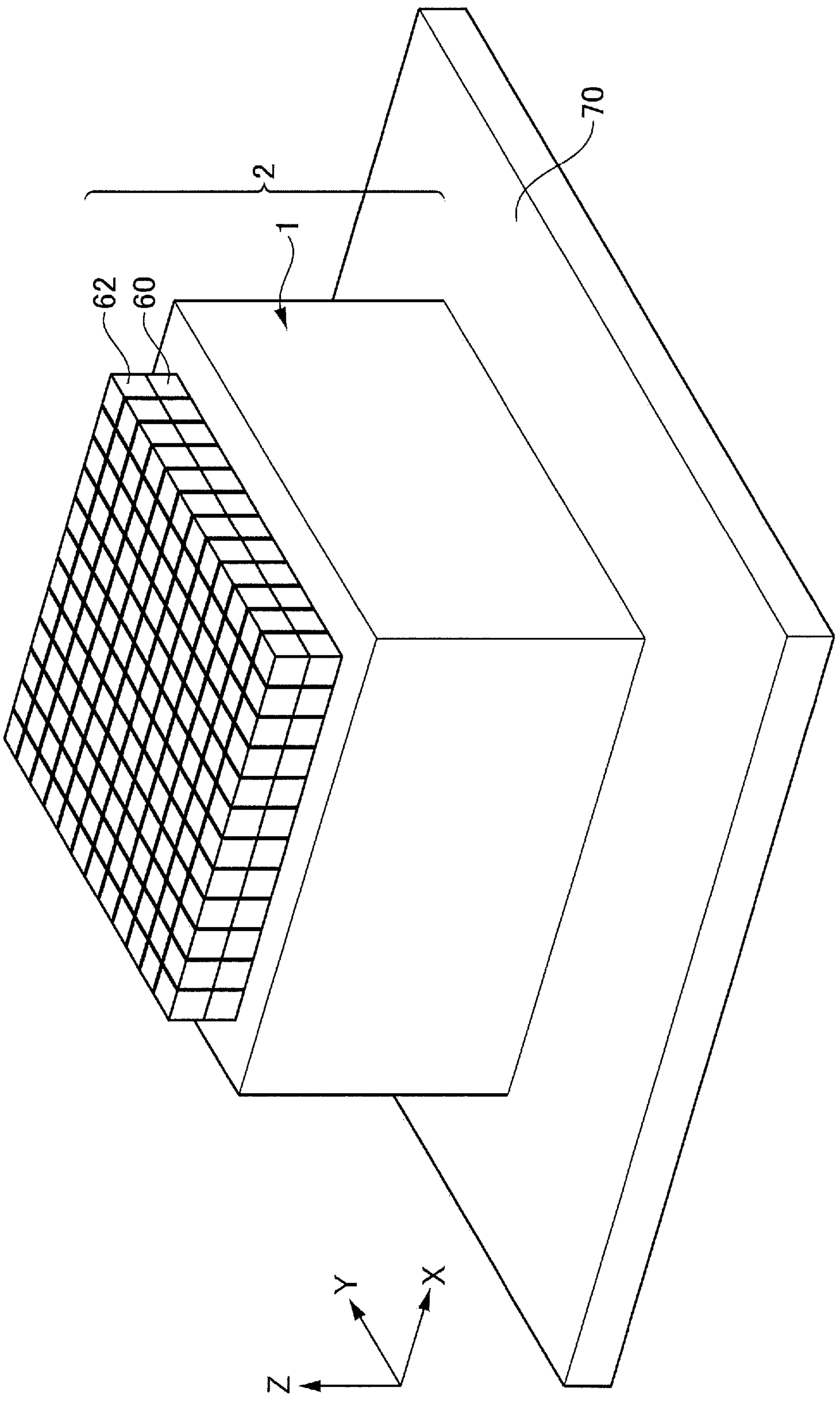
FIG. 1 is a perspective view illustrating an example of an ultrasonic probe having a backing member according to a first embodiment.

Preferred embodiments of the present invention will be described with reference to the accompanying drawings. In the drawings, those parts that are the same are designated by the same reference numerals, and a repeated description of the same parts may be omitted.

First Embodiment

[Ultrasonic Probe]

First, an ultrasonic probe having a backing member 1 according to a first embodiment will be described.

Figure 2:
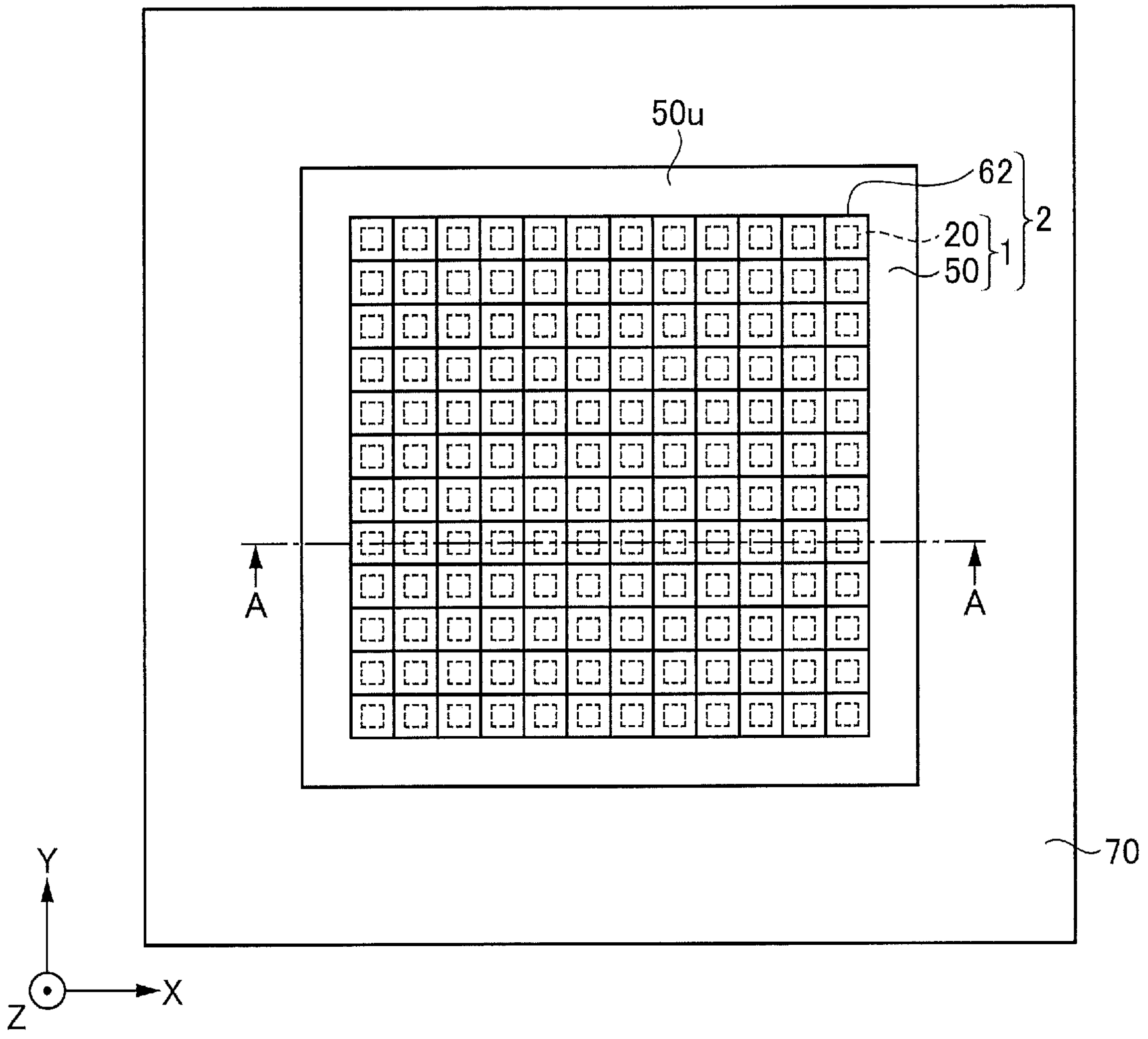
FIG. 2 is a plan view illustrating the example of the ultrasonic probe having the backing member according to the first embodiment.
Figure 3:
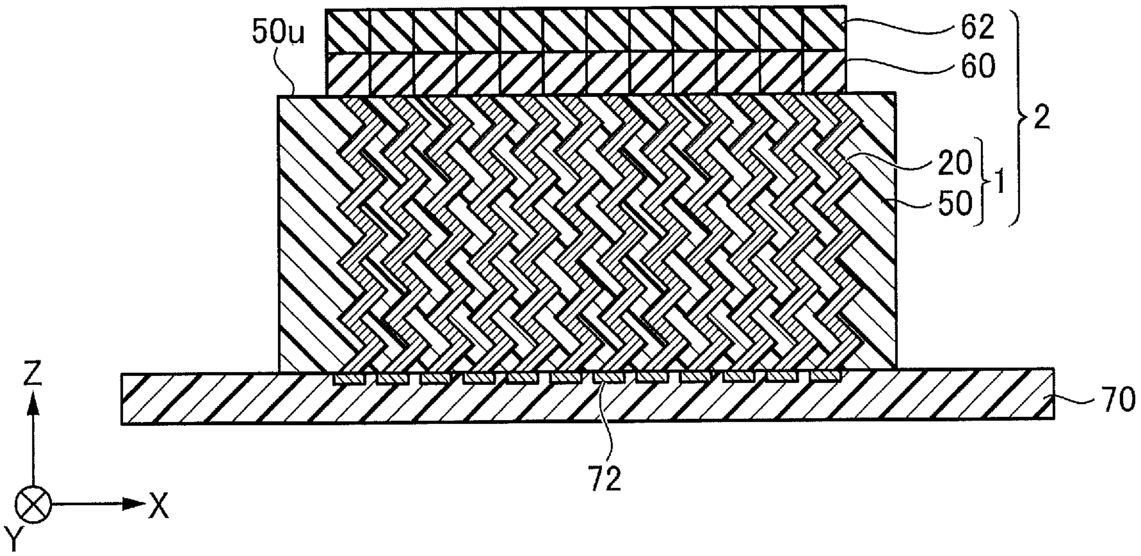
FIG. 3 is a cross sectional view illustrating the example of the ultrasonic probe having the backing member according to the first embodiment.

FIG. 1 is a perspective view illustrating an example of the ultrasonic probe having the backing member according to the first embodiment. FIG. 2 is a plan view illustrating the example of the ultrasonic probe having the backing member according to the first embodiment. FIG. 3 is a cross sectional view illustrating the example of the ultrasonic probe having the backing member according to the first embodiment, and illustrates the cross section along a line A-A in FIG. 2.

As illustrated in FIG. 1 through FIG. 3, an ultrasonic probe 2 includes the backing member 1, a piezoelectric element 60 arranged on the backing member 1, and an acoustic adjustment layer 62 arranged on the piezoelectric element 60. The ultrasonic probe 2 further includes an acoustic lens (not illustrated) that is mounted on the acoustic adjustment layer 62. The backing member 1 includes a resin layer 50, and a plurality of leads 20 embedded in the resin layer 50.

In this embodiment, a plan view of an object refers to a view of the object viewed from a normal direction to an upper surface 50*u* of the resin layer 50. In addition, a planar shape of the object refers to a shape of the object in the plan view viewed from the normal direction to the upper surface 50*u* of the resin layer 50.

In addition, in this embodiment, in the plan view, a first arrangement direction (or row direction) of the plurality of leads 20 arranged in rows is referred to as an X-direction, and a second arrangement direction (or column direction) of the plurality of leads 20 is referred to as a Y-direction. Further, a direction perpendicular to the X-direction and the Y-direction is referred to as a Z-direction. In other words, the Z-direction is a longitudinal direction of each of the plurality of leads 20, and is also a thickness direction of the resin layer 50. In the example illustrated in FIG. 1 through FIG. 3, the plurality of leads 20 are arranged in 12 rows and 12 columns in the plan view.

The piezoelectric element 60 is segmented into a large number of segments that are arranged two-dimensionally. The piezoelectric element 60 is an ultrasonic transducer, and the piezoelectric element 60 transmits and receives the ultrasonic wave.

The acoustic adjustment layer 62, that is arranged on the piezoelectric element 60, is formed to efficiently inject the ultrasonic wave from the piezoelectric element 60 into the object. The acoustic adjustment layer 62 is segmented into a large number of segments that are arranged two-dimensionally, in correspondence with the segments of the segmented piezoelectric element 60.

Further, a wiring board 70 is arranged below the ultrasonic probe 2. The wiring board 70 may be mounted with electronic components, such as a driving circuit or the like of the piezoelectric element 60. Alternatively, the wiring board 70 may simply be a relay (or intermediate) board.

Moreover, the backing member 1 arranged below the piezoelectric element 60 includes functions to insulate the ultrasonic wave propagating toward a rear of the ultrasonic probe 2 (in a direction opposite to the acoustic adjustment layer 62) from the piezoelectric element 60, and reduce excess vibrations so that a pulse width of the ultrasonic wave is reduced, thereby improving a distance resolution of an image. Accordingly, it is possible to obtain the ultrasonic probe 2 with low noise.

In the backing member 1, each lead 20 arranged within the resin layer 50 includes at least one bent portion or curved portion (portion non-parallel to the Z-direction). An upper tip end surface of each lead 20 is electrically connected to a lower surface of the piezoelectric element 60. In addition, a lower tip end surface of each lead 20 is electrically connected to a connection electrode 72 of the wiring board 70.

A voltage is supplied from the wiring board 70 to each segment of the segmented piezoelectric element 60 through each lead 20 of the backing member 1. In the following, the segments of the segmented piezoelectric element 60 may also be referred to as piezoelectric elements 60. The ultrasonic wave is transmitted from each piezoelectric element 60 to the subject.

[Backing Member]

Next, the backing member according to the first embodiment will be described.

Figure 4:
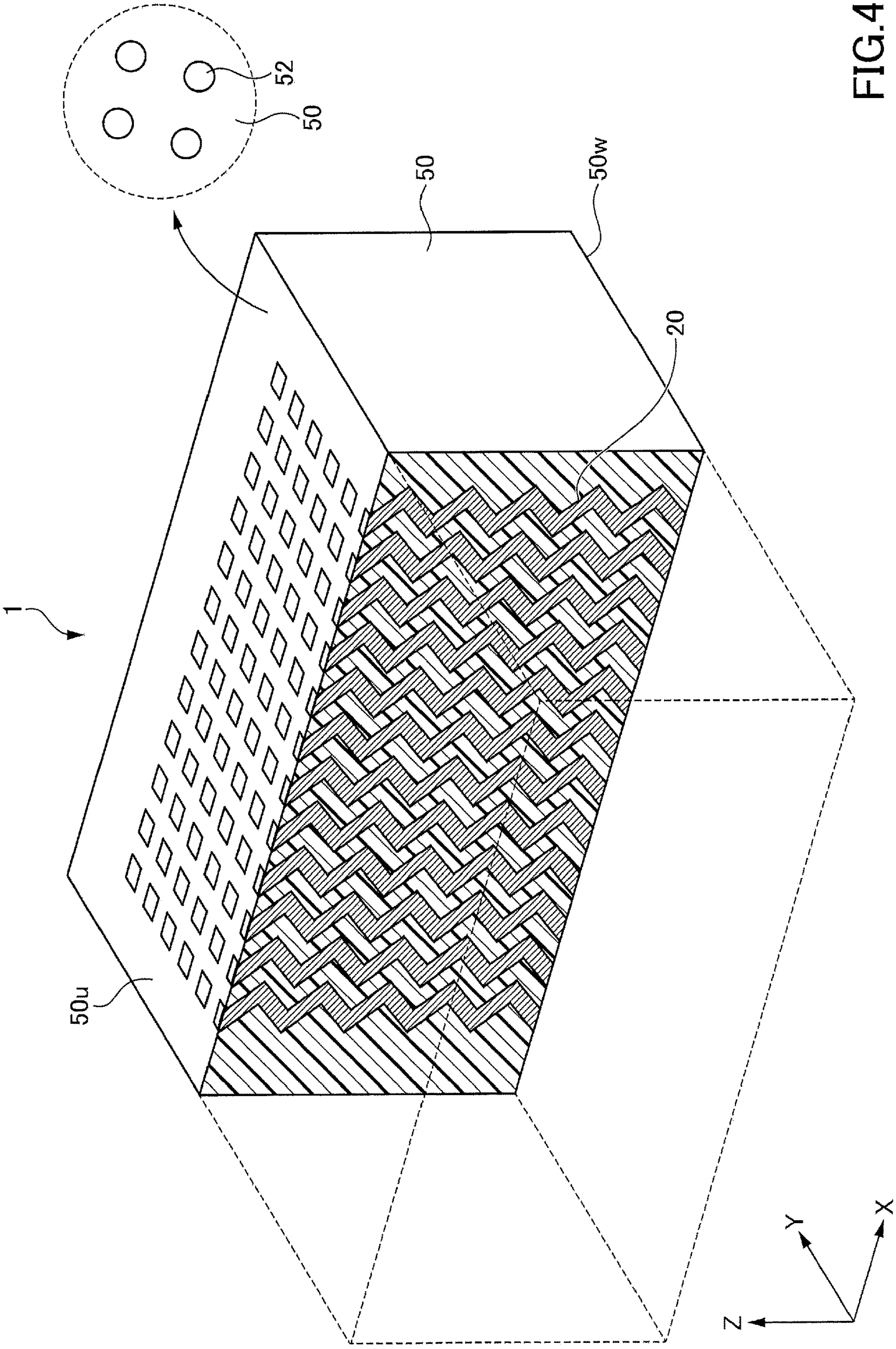
FIG. 4 is a cross sectional perspective view illustrating the example of the backing member according to the first embodiment.

FIG. 4 is a cross sectional perspective view illustrating the example of the backing member according to the first embodiment. As illustrated in FIG. 4, the backing member the includes a resin layer 50, and the plurality of leads 20 embedded in the resin layer 50. In the example illustrated in FIG. 4, the resin layer 50 is formed by a rectangular parallelepiped shape, but may be formed by various other three-dimensional shapes, such as a cylinder or the like.

A filler 52 is included in resin layer 50, as illustrated on an enlarged scale at a top right portion in FIG. 4. For example, the resin layer 50 is formed of an epoxy resin or the like, and the filler 52 is formed of tungsten, alumina, hollow glass spheres (or balloons), resin materials, or the like. The resin materials may include urethane, silicone, or the like.

Each lead 20 is a linear conductor, and is arranged to penetrate the resin layer from the upper surface 50*u* (first surface) to the lower surface 50*w* (second surface) of the resin layer 50. The linear conductor refers to a conductor having an elongated shape with a length and a width such that the length is sufficiently long with respect to the width.

The upper tip end surface of each lead 20 is exposed from the upper surface 50*u* of the resin layer 50. The upper tip end surface of each lead 20 coincides with the upper surface 50*u* of the resin layer 50, for example. Similarly, the lower tip end surface of each lead 20 is exposed from the lower surface 50*w* of the resin layer 50. The lower tip end surface of each lead 20 coincides with the lower surface 50*w* of the resin layer 50, for example.

In the backing member 1, scattering and absorption of the ultrasonic wave can be achieved by including the filler 52 in the resin layer 50.

A spacing of the leads 20 in the X-direction and a spacing of the leads 20 in the Y-direction are preferably set greater than an average grain diameter (or grain size) of the filler 52. Hence, the filler 52 can be dispersed generally throughout the entire resin layer 50 of the backing member 1, thereby providing the function of sufficiently achieving the scattering and absorption of the ultrasonic wave.

In the example illustrated in FIG. 4, the upper surface 50*u* and the lower surface 50*w* of the resin layer 50 of the backing member 1 are horizontal surfaces that are approximately parallel to each other. However, the upper surface 50*u* and the lower surface 50*w* of the resin layer 50 are not limited such an horizontal arrangement, and in a case where a convex type ultrasonic transducer is manufactured, for example, the upper surface 50*u* of the resin layer 50 having the piezoelectric element 60 arranged thereon may be a convex curved surface.

In this case, the upper tip end surface of each lead 20 and the upper surface 50*u* of the resin layer 50 are ground to become the same convex curved surface.

Each lead 20 includes a metal material having an ultrasonic wave insulating property that is capable of insulating the ultrasonic wave (having a frequency of 5 MHz, for example). The ultrasonic wave insulating property refers to the property (or ability) to absorb, reflect, and/or scatter the ultrasonic wave. Examples of the metal material having the ultrasonic wave insulating property include metal materials having a specific gravity of 10 or greater, such as tungsten, gold, platinum, palladium, ruthenium, or the like. The metal material having the ultrasonic wave insulating property may include two or more such metal materials including tungsten, gold, platinum, palladium, ruthenium, or the like.

Each lead 20 may be formed from the metal material itself having the ultrasonic wave insulating property. Each lead 20 may be formed of a material including tungsten, for example. Examples of the material including tungsten include tungsten itself, copper tungsten, tungsten carbide, tungsten potassium, aluminum-potassium-silicate-tungsten, tungsten lanthanum, tungsten seria, tungsten rhenium, or the like.

The surface of each lead 20 may be covered by a plated film including a metal material having the ultrasonic wave insulating property. Examples of the plated film including the metal material having the ultrasonic wave insulating property, include a nickel tungsten plated film, a nickel boron tungsten plated film, an iron-tungsten plated film, an iron-nickel-tungsten plated film, or the like. In this case, portions of each lead 20 other than the plated film do not need to include the metal material having the ultrasonic wave insulating property. Examples of a material forming the portions of each lead 20, other than the surface of each lead 20, include copper, copper alloys, or the like.

Each lead 20 includes at least one bent portion or curved portion (portion non-parallel to the Z-direction). The bent portion refers a portion that bends at one point without having a radius of curvature, and the curved portion refers to a portion that gradually curves with a predetermined radius of curvature. The bent portion and the curved portion do not necessarily have to be distinguished from each other.

Because each lead 20 includes the metal material having the ultrasonic wave insulating property, and includes at least one bent portion or curved portion, the lead 20 itself can insulate noise in the ultrasonic wave.

Since the noise insulating effect of the lead 20 itself is added to the noise reducing effect of the filler 52 included in the resin layer 50, it is possible to further improve the noise reducing effect of the backing member 1. However, in a case where the noise insulating effect of the lead 20 itself is sufficient for the specifications required with respect to the backing member 1, the resin layer 50 does not need to include the filler 52.

When the backing member 1 is used for the ultrasonic probe 2, each lead 20 can absorb, reflect, and/or scatter the ultrasonic wave propagating toward the rear of the piezoelectric element 60 (in the direction opposite the acoustic adjustment layer 62). As a result, in the ultrasonic probe 2, the pulse width of the ultrasonic wave can be reduced by reducing the excess vibration of the ultrasonic wave, thereby improving the distance resolution of the image.

Each lead 20 preferably includes a plurality of bent portions or curved portions. In this case, it is possible to improve the performance of each lead 20 that insulates the noise in the ultrasonic wave. The leads 20 preferably have identical shapes. In this case, it is possible to avoid a short-circuit, even when the pitch of the leads 20 becomes narrow.

Each lead 20 may be formed to a zigzag shape with a plurality of bent portions (nine bent portions in the example illustrated in FIG. 4), for example. However, the shape of each lead 20 is not limited to the zigzag shape, and may have various other shapes including the shape illustrated in FIG. 5.

FIG. 5A, FIG. 5B, FIG. 5C, and FIG. 5D are views in partial cross section illustrating other examples of the leads having the bent portions or curved portions. As in the example illustrated in FIG. 5A, each lead 20 may be formed in a wave shape with a plurality of curved portions (nine curved portions in the example illustrated in FIG. 5A).

In addition, when each lead 20 is formed to the zigzag shape as in the example illustrated in FIG. 4, a portion inclined in a predetermined direction with respect to the Z-direction, and a portion inclined in a direction opposite to the predetermined direction, may be connected to form the bent portion, but the shape of each lead 20 is not limited to such a zigzag shape. As in the example illustrated in FIG. 5B, a portion perpendicular to the Z-direction, and a portion parallel to the Z-direction, may be connected to form the bent portion.

Figure 5A:
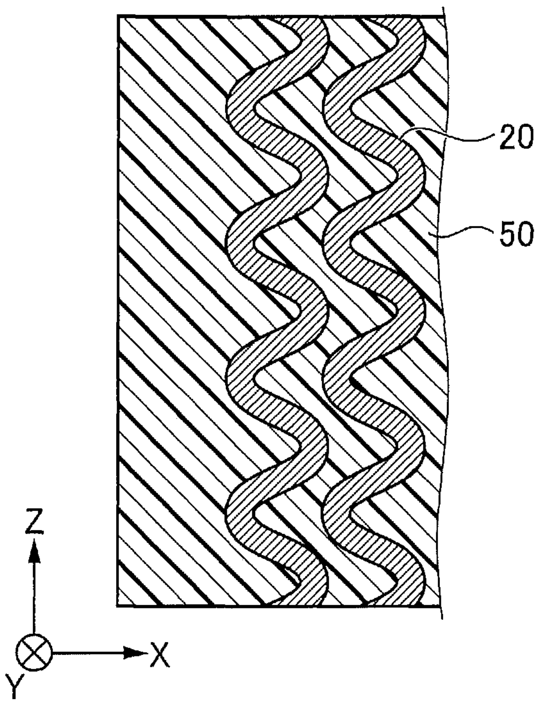
FIG. 5A, FIG. 5B, FIG. 5C, and FIG. 5D are views in partial cross section illustrating other examples of leads having bent portions or curved portions.
Figure 5B:
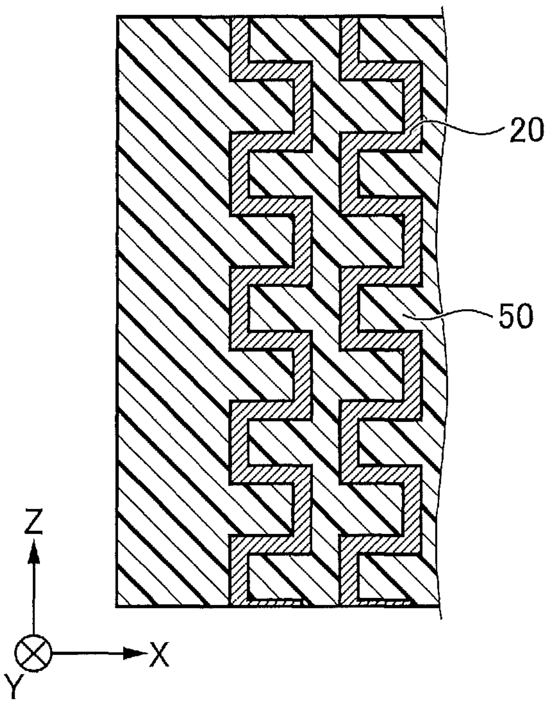
Figure 5C:
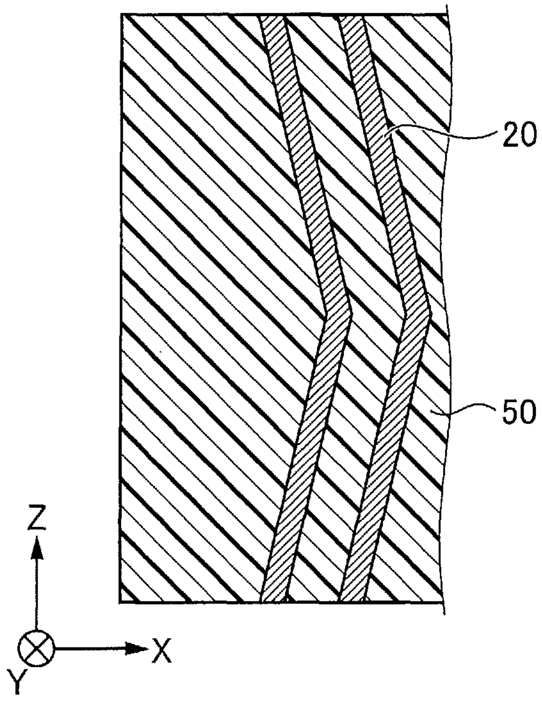
Figure 5D:
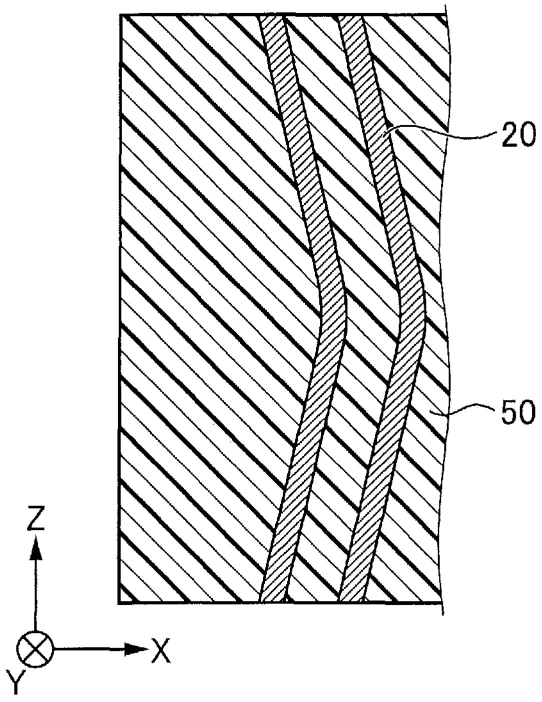

Moreover, as in the example illustrated in FIG. 5C, each lead 20 may include at least one bent portion. Alternatively, as in the example illustrated in FIG. 5D, each lead 20 may include at least one curved portion. In addition, the bent portion, the curved portion, and a straight portion may coexist, as appropriate.

Figure 6A:
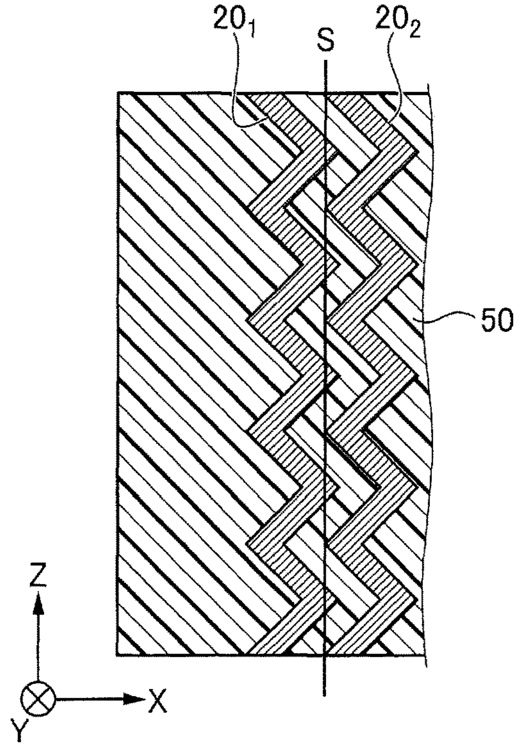
FIG. 6A and FIG. 6B are diagrams for explaining preferable positional relationships of adjacent leads.
Figure 6B:
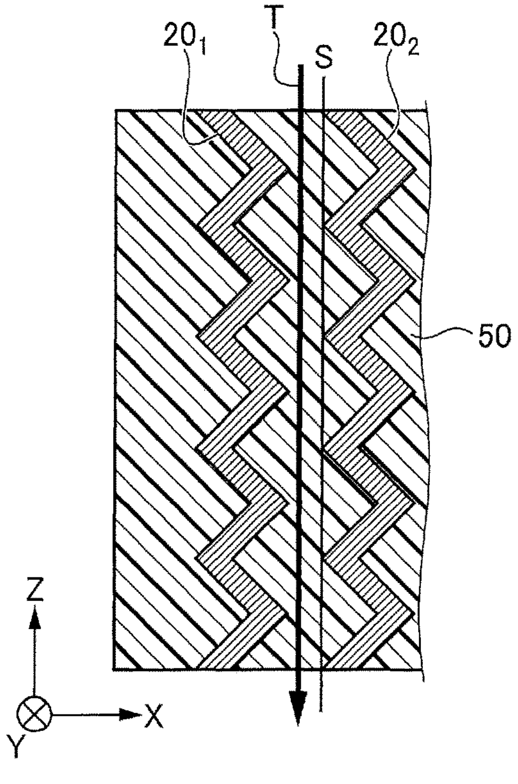

FIG. 6A and FIG. 6B are diagrams for explaining preferable positional relationships of adjacent leads. For the sake of convenience, in FIG. 6A and FIG. 6B, the lead 20 on the left side is designated as a lead $20_1$, and the lead 20 on the right side is designated as a lead $20_2$. Further, in FIG. 6A and FIG. 6B, a straight line S refers to a line connecting vertices of the lead $20_2$ on the side of the lead $20_1$.

In FIG. 6A and FIG. 6B, the proximity of each vertex of the lead $20_1$ forms a convex region of the bent portion of the lead $20_1$. On the other hand, each triangular region surrounded by sloping sides of the lead $20_2$ and the straight line S forms a concave region of the bent portion of the lead $20_2$.

In FIG. 6A, the convex region of the bent portion of the lead $20_1$ protrudes into the concave region of the bent portion of the lead $20_2$. On the other hand, in FIG. 6B, the convex region of the bent portion of the lead $20_1$ does not protrude into concave region of the bent portion of the lead $20_2$.

When the adjacent leads 20 have the position relationship illustrated in FIG. 6B, the ultrasonic wave propagating rearward from the piezoelectric element 60 passes through a vicinity of an arrow T. In other words, in the vicinity of the arrow T, the ultrasonic wave propagating rearward from the piezoelectric element 60 does not reach any of the leads 20, and thus, the noise insulating effect of the lead 20 cannot be exhibited.

Accordingly, in order to avoid the problem of FIG. 6B, the adjacent leads 20 preferably have the positional relationship illustrated in FIG. 6A. In other words, the convex region of the bent portion or curved portion of one of the two mutually adjacent leads 20 preferably protrudes into the concave region of the bent portion or the curved portion of the other of the two mutually adjacent leads 20.

[Method of Manufacturing Backing Member]

FIG. 7A through FIG. 16B are diagrams illustrating an example of a process of manufacturing the backing member according to the first embodiment.

Figure 7A:
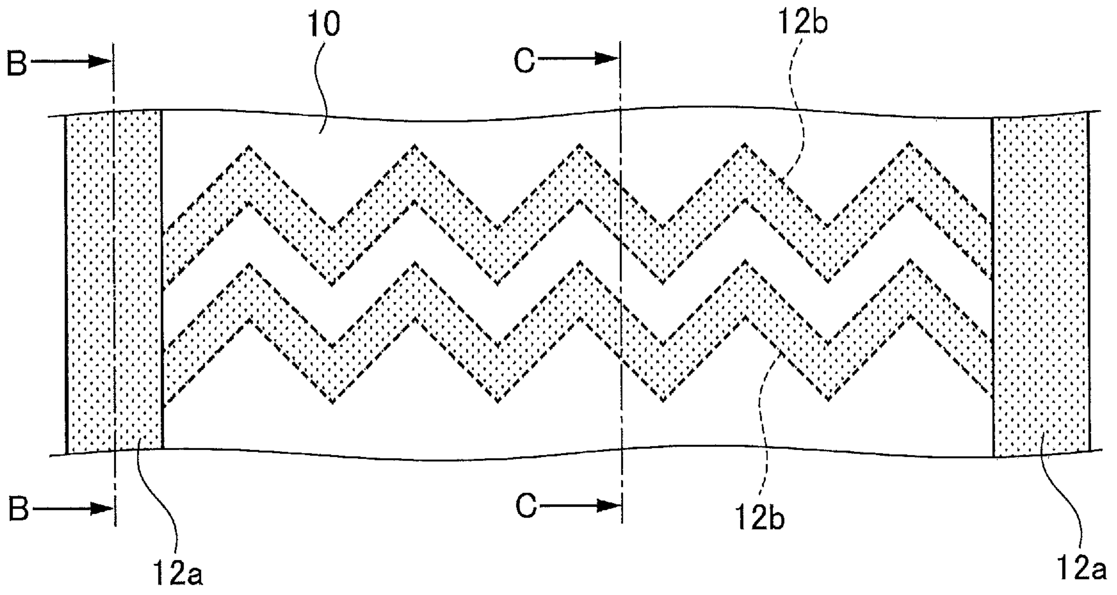
FIG. 7A, FIG. 7B, and FIG. 7C are diagrams (part 1) illustrating an example of a process of manufacturing the backing member according to the first embodiment.
Figure 7B:
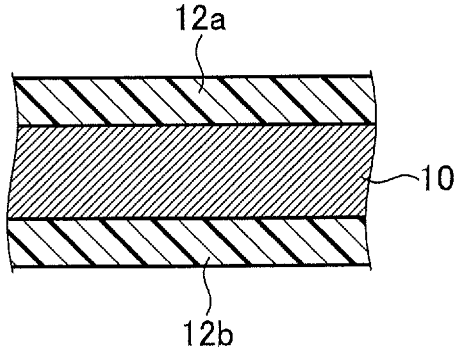
Figure 7C:
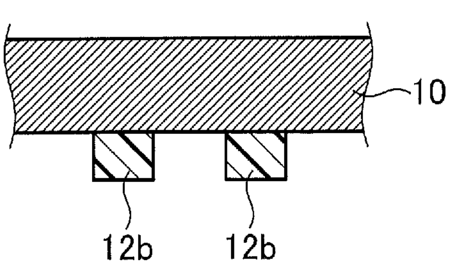

First, as illustrated in FIG. 7A, FIG. 7B, and FIG. 7C, a metal plate 10 is prepared. FIG. 7A is a plan view of the metal plate 10, FIG. 7B is a cross sectional view along a line B-B in FIG. 7A, and FIG. 7C is a cross sectional view along a line C-C in FIG. 7A.

The metal plate 10 may be a copper alloy plate used for lead frames, for example. The metal plate 10 has a thickness of approximately 150 μm, for example. FIG. 7A through FIG. 7C, partially illustrates the metal plate 10 in a region where the two leads are arranged.

Next, in order to form a plurality of leads on the metal plate 10, a first resist layer 12*a* is formed on an upper surface of the metal plate 10, and a second resist layer 12*b* is formed on a lower surface of the metal plate 10. The first resist layer 12*a* and the second resist layer are patterned, by exposure and development based on a photolithography technique. Each lead is formed in a state connected to an outer frame obtained from the metal plate 10.

As illustrated in FIG. 7A and FIG. 7B, the first resist layer 12*a*, formed on the upper surface of the metal plate 10, is formed with a pattern corresponding only to the outer frame. In other words, on the upper surface of the metal plate 10, the first resist layer 12*a* is not formed in the region where each lead is to be arranged, and the first resist layer 12*a* has an opening that is formed in one-shot in the region where each lead is to be arranged.

On the other hand, as illustrated in FIG. 7A and FIG. 7C, the second resist layer 12*b*, formed on the lower surface of the metal plate 10, is formed with a pattern corresponding to the entirety of the outer frame and the leads connecting to the outer frame.

In contrast to the example illustrated in FIG. 7A through FIG. 7C, the first resist layer 12*a* may be formed on the lower surface of the metal plate 10, and the second resist layer 12*b* may be formed on the upper surface of the metal plate 10. In other words, the first resist layer 12*a* may be formed on a first surface of the metal plate 10, and the second resist layer 12*b* may be formed on a second surface of the metal plate 10, opposite to the first surface of the metal plate 10.

Figure 8A:
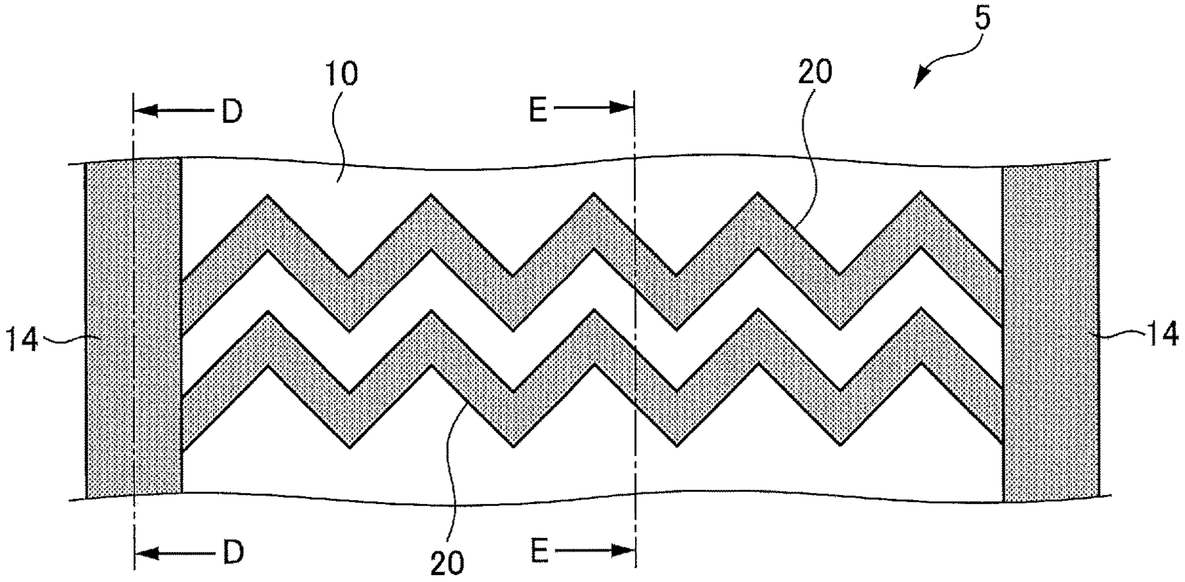
FIG. 8A, FIG. 8B, and FIG. 8C are diagrams (part 2) illustrating the example of the process of manufacturing the backing member according to the first embodiment.
Figure 8B:
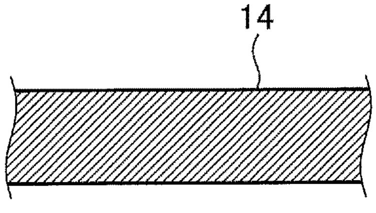
Figure 8C:
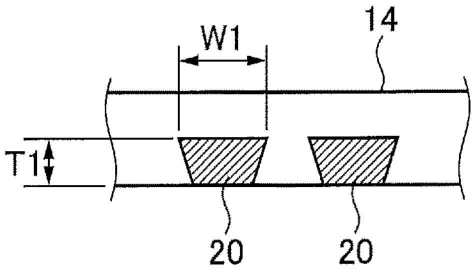

Next, as illustrated in FIG. 8A, FIG. 8B, and FIG. 8C, the metal plate 10 is etched by a wet etching from the upper surface and the lower surface of the metal plate 10, using the first resist layer 12*a* and the second resist layer 12*b* as masks, respectively, and the first resist layer 12*a* and the second resist layer 12*b* are thereafter removed. FIG. 8A is a plan view of the metal plate 10, FIG. 8B is a cross sectional view along a line D-D in FIG. 8A, and FIG. 8C is a cross sectional view along a line E-E in FIG. 8A.

For example, a spray etching may be employed as the wet etching. Examples of an etchant usable for the wet etching include a ferric chloride aqueous solution, a cupric chloride aqueous solution, an ammonium persulfate aqueous solution, or the like.

In the case of the spray etching, the etchant is sprayed onto the upper surface and the lower surface of the metal plate 10, and a half-etching is simultaneously performed from the upper surface and the lower surface of the metal plate 10 in the thickness direction, to penetrate the metal plate 10.

Accordingly, the plurality of leads 20, that connect to an outer frame 14, are formed. An etching rate can be adjusted on the side of the upper surface and on the side of the lower surface of the metal plate 10, by adjusting a spray pressure or the like of the spray etching. In the example illustrated in FIG. 8A through FIG. 8C, the etching rate on the side of the upper surface of the metal plate 10 is set high, so that the thickness of the leads 20 is less than one-half the thickness of the outer frame 14.

A laser beam machining method, a press working method, or the like may be used in place of the wet etching.

A width W1 of the leads 20 is approximately 40 μm to approximately 80 μm, for example. In addition, a thickness T1 of the leads 20 is approximately 40 μm to approximately 80 μm, for example. The pitch of the leads 20 is approximately 100 μm to approximately 300 μm, for example. The cross sectional shape of the leads 20 is formed to a rectangular shape similar to a trapezoidal shape, for example.

Figure 9:
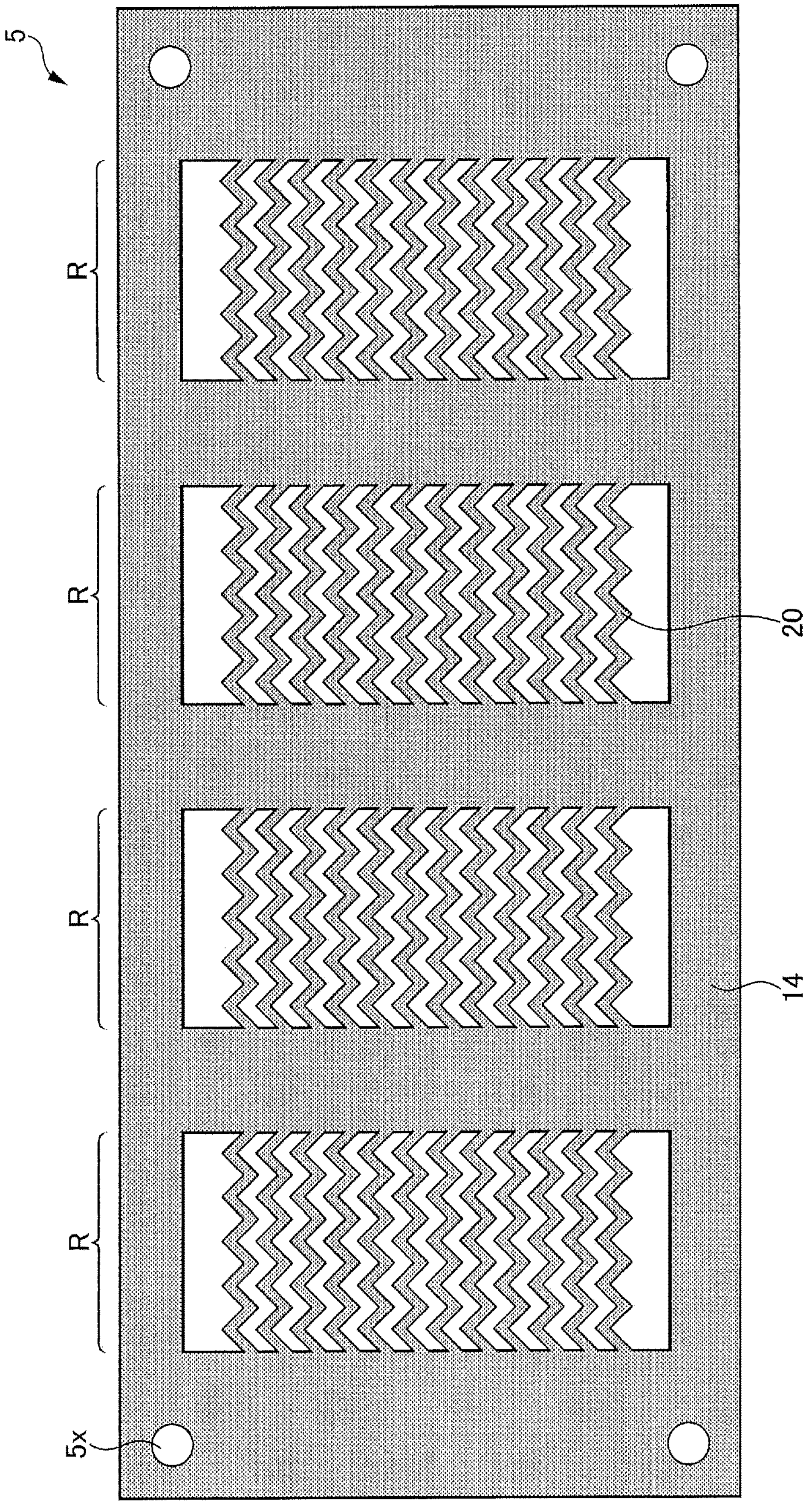
FIG. 9 is a diagram (part 3) illustrating the example of the process of manufacturing the backing member according to the first embodiment.

FIG. 9 illustrates an overall view of a single lead frame 5 having the large number of leads 20 formed by the method described above. In the example of the lead frame 5 illustrated in FIG. 9, the leads 20 are arranged side by side along the vertical direction in four product regions (or areas) R. In each product region R, the leads 20 are connected to and supported by the outer frame 14. Moreover, a guide hole 5*x* to be inserted with a guide pin for positioning, is formed at four corners of the lead frame 5.

In a case where the lead frame 5 is made of a copper alloy or the like and does not include a metal material having an ultrasonic wave insulating property, unlike tungsten, a plated film that includes a metal material having the ultrasonic wave insulating property is formed on the surface of the lead frame 5 in the state illustrated in FIG. 9.

For example, the plated film (in particular, a nickel tungsten plated film, for example) including the metal material having the ultrasonic wave insulating property, such as tungsten, is formed on the surface of the lead frame 5 by electroplating. Electroless plating may be used in place of the electroplating. The plated film may be formed to a thickness of approximately 0.1 μm to approximately 2 μm, for example. Pin holes are less likely to be formed when the thickness of the plated film is 0.1 μm or greater, and the plated film can easily be formed by the electroplating when the thickness of the plated film is 2 μm or less.

In a case where the lead frame 5 is formed of a metal material (for example, tungsten) that itself has the ultrasonic wave insulating property, the plated film need not be formed on the surface of the lead frame 5.

Figure 10:
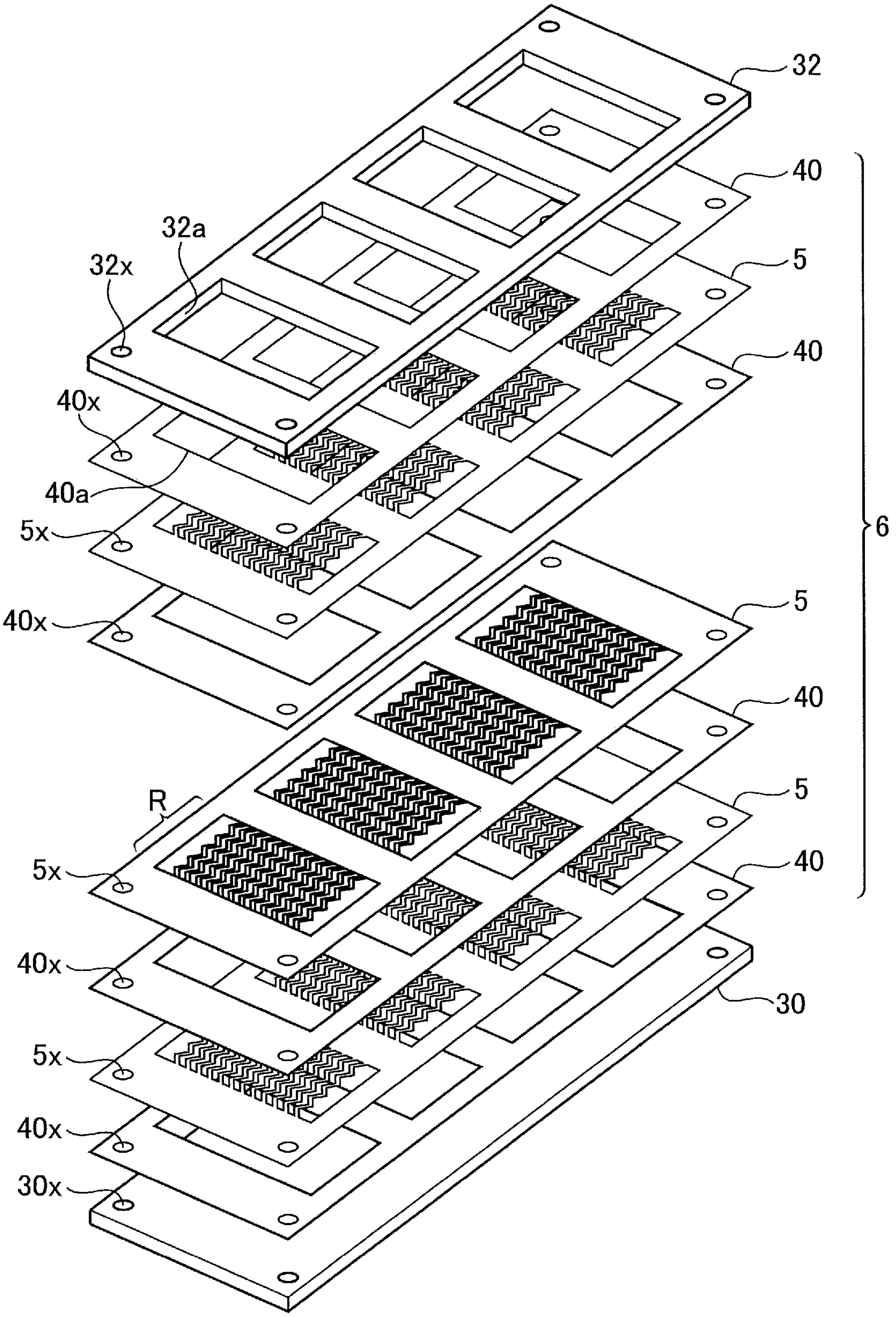
FIG. 10 is a diagram (part 4) illustrating the example of the process of manufacturing the backing member according to the first embodiment.

Next, a method of constructing the backing member 1 using the lead frame 5 illustrated in FIG. 9 will be described. First, as illustrated in FIG. 10, a plurality of lead frames 5 respectively having the configuration illustrated in FIG. 9, are prepared. In FIG. 10, three lead frames 5 are illustrated for the sake of convenience.

In addition, a lower support plate 30 and an upper support plate 32 are also prepared. An opening 32*a* is formed in the upper support plate 32 for injecting a resin. The opening 32*a* of the upper support plate 32 is arranged in correspondence with the product region R of the lead frame 5.

Further, a guide hole 32*x*, corresponding to the guide hole 5*x* of the lead frame 5, is formed at four corners of the upper support plate 32.

The lower support plate 30 does not have an opening for stopping the injected resin, and is formed of a single sheet. In addition, the upper surface of the lower support plate 30 is subjected to a fluororesin treatment, so that the injected resin can easily be stripped off from the surface of the lower support plate 30. Alternatively, instead of performing the fluororesin treatment, a fluororesin sheet, a polyethylene sheet, or the like may be arranged on the lower support plate 30.

A guide hole 30*x*, corresponding to the guide hole 5*x* of the lead frame 5, is formed at four corners of the lower support plate 30.

Further, a plurality of spacers 40 are prepared. The spacers 40 are formed with openings 40*a* for injecting the resin. Each opening 40*a* of the spacer 40 is arranged in correspondence with the product region R of the lead frame 5 described above.

The spacers 40 are arranged to determine the pitch at which the leads 20 of the laminated lead frames 5 are arranged, along a laminating direction in which the lead frames 5 are laminated. The spacers 40 are formed of an elastic body preferably using an elastomeric resin, such as a resin sponge, an elastic rubber, or the like. The pitch at which the leads 20 are arranged along the laminating direction can be adjusted by compressing the spacers 40 to a desired thickness.

A guide holes 40*x*, corresponding to the guide hole 5*x* of the lead frame 5 described above, is formed at four corners of the spacer 40.

The lead frames 5 are then laminated with the spacer 40 interposed between the adjacent lead frames 5, and the laminated lead frames 5 are arranged between the lower support plate 30 and the upper support plate 32.

The example illustrated in FIG. 10 will be described in more detail. The spacer 40 is arranged between the lower support plate 30 and the lower lead frame 5. The spacer 40 is also arranged between the lower lead frame 5 and the intermediate lead frame 5.

In addition, the spacer 40 is arranged between the intermediate lead frame 5 and the upper lead frame 5. Further, the spacer 40 is arranged between the upper lead frame 5 and the upper support plate 32.

A guide pin (not illustrated) is then inserted from the guide hole 32*x* of the upper support plate 32 through each guide hole 40*x* of the spacers 40 and each guide hole 5*x* of the lead frames 5, to the guide hole 30*x* of the lower support plate 30, at each of the four corners.

Hence, the opening 32*a* of the upper support plate 32 and each opening 40*a* of the spacers 40 are positionally aligned to each product region R of each lead frame 5.

In this manner, a laminated body 6, having a plurality of lead frames 5 laminated via the spacers 40, is arranged between the lower support plate 30 and the upper support plate 32.

In actual practice, approximately 20 to approximately 40 lead frames 5 are laminated via the spacers 40.

Figure 11:
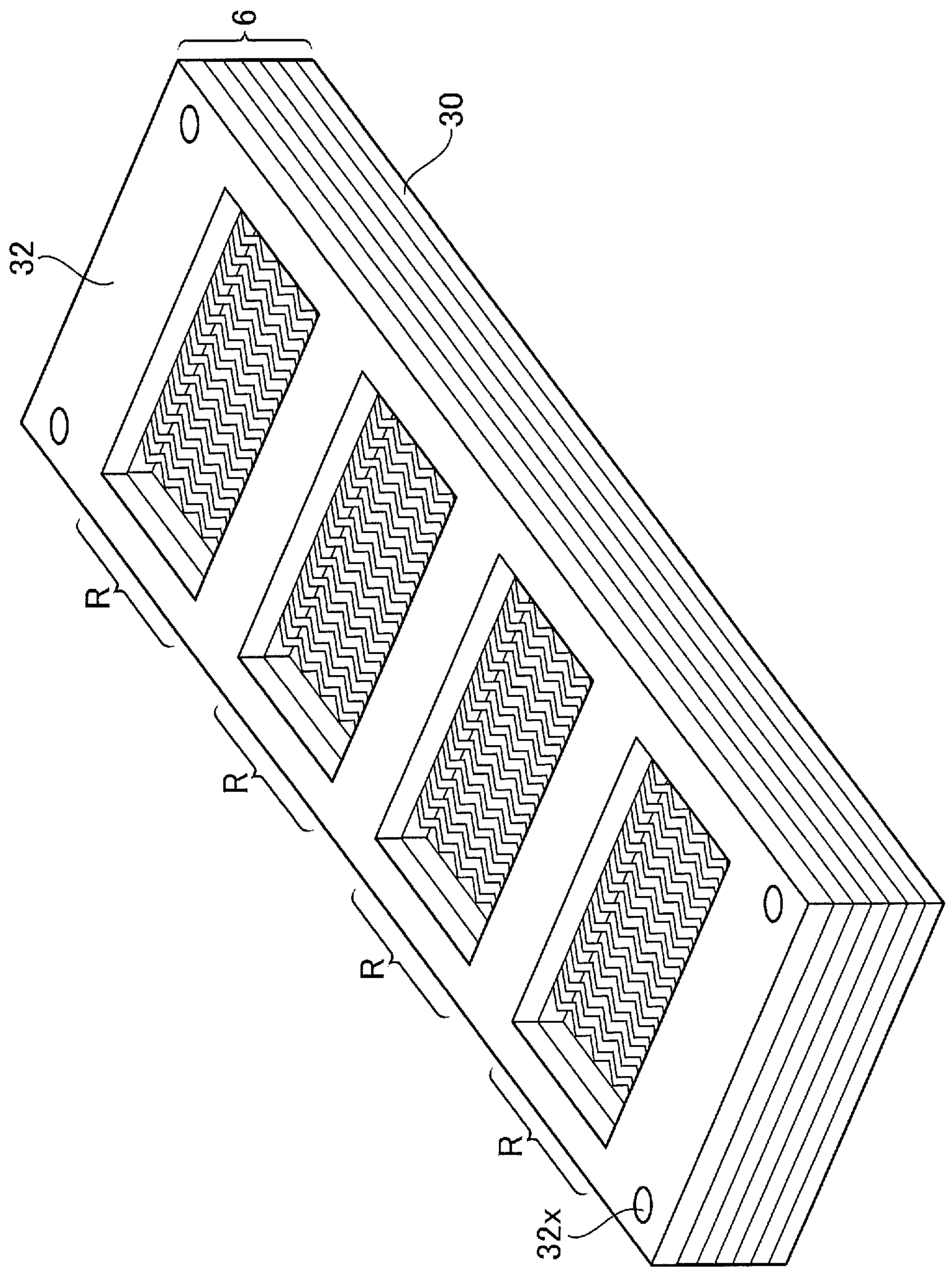
FIG. 11 is a diagram (part 5) illustrating the example of the process of manufacturing the backing member according to the first embodiment.

Further, as illustrated in FIG. 11, the laminated body 6, sandwiched between the lower support plate 30 and the upper support plate 32, is compressed and fixed in a state where the spacers 40, formed of the elastic body, are compressed to a desired thickness.

For example, the structure illustrated in FIG. 11 is arranged on a stage (not illustrated), and a pressure is applied downward on the upper support plate 32 by a pressing member (not illustrated). Alternatively, the structure illustrated in FIG. 11 may be sandwiched between pressing members (not illustrated), and the pressure may be applied from both the upper and lower sides.

Accordingly, the spacing of the leads 20 of the laminated lead frames 5, arranged along the laminating direction, is determined by the thickness of the compressed spacers 40.

The method of compressing the laminated body 6, sandwiched between the lower support plate 30 and the upper support plate 32, to the desired thickness, may include a method that uses of a height adjusting stopper.

Figure 12:
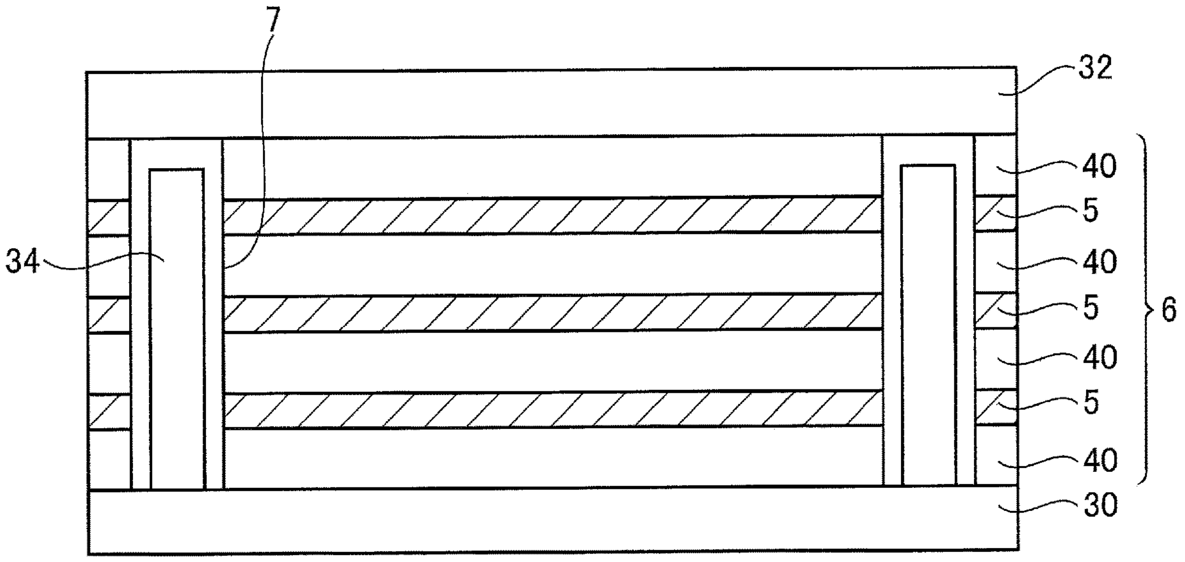
FIG. 12 is a diagram (part 6) illustrating the example of the process of manufacturing the backing member according to the first embodiment.

For example, as illustrated in FIG. 12, a through hole 7 is formed in the laminated body 6 sandwiched between the lower support plate 30 and the upper support plate 32. In addition, when laminating the lead frames 5, a height adjusting stopper 34 is arranged inside the through hole 7.

Figure 13:
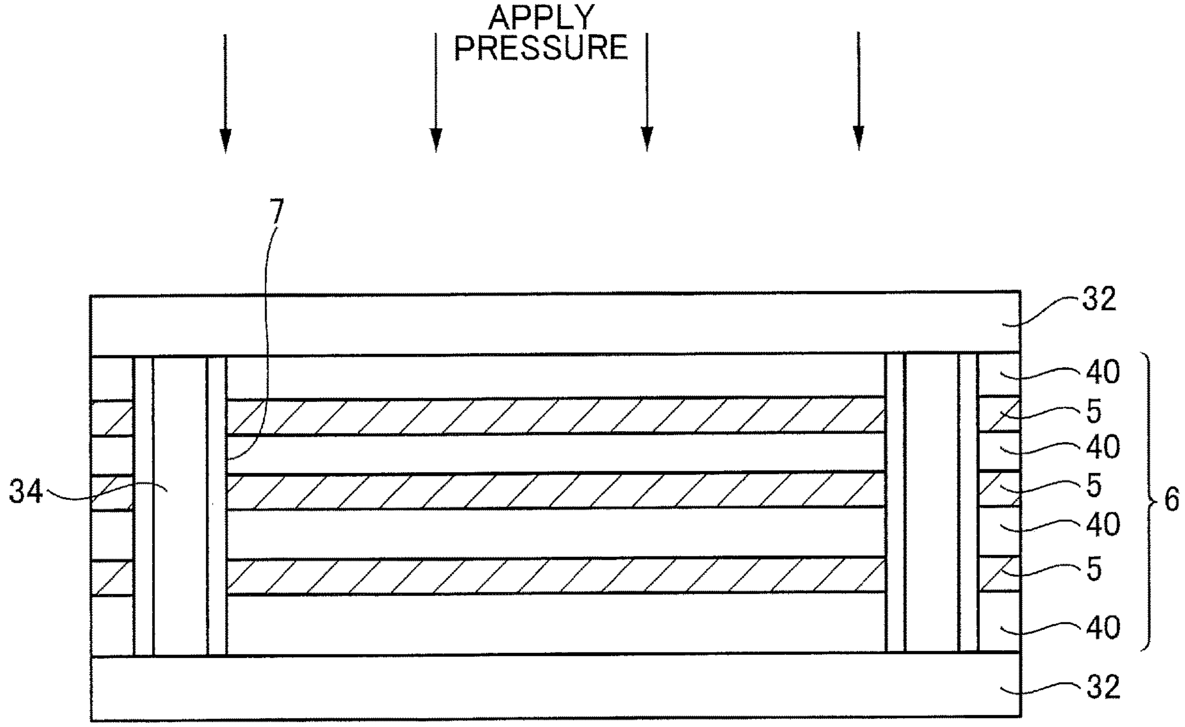
FIG. 13 is a diagram (part 7) illustrating the example of the process of manufacturing the backing member according to the first embodiment.

Then, as illustrated in FIG. 13, a pressure is applied downward on the upper support plate 32 as indicated by arrows, so that the upper support plate 32 makes contact with an upper end of the height adjusting stopper 34. The thickness of the laminated body 6 sandwiched between the lower support plate 30 and the upper support plate 32 can be adjusted to the desired thickness, by adjusting the height of the height adjusting stopper 34.

Accordingly, since the thickness of the spacers 40 of the laminated body 6 are adjusted, it is possible to adjust the pitch of the leads 20 of the laminated lead frames 5, arranged along the laminating direction.

In this manner, the pitch at which the leads 20 are arranged in the horizontal direction, and the pitch at which the leads 20 are arranged in the vertical direction, can be accurately set to approximately 300 μm or less, respectively.

Hence, by laminating the plurality of lead frames 5, formed with the plurality of leads 20, via the spacers 40, the leads 20 can be arranged accurately at a small pitch in both the horizontal and vertical directions. In addition, since a plurality of product regions R can be formed in the lead frame 5, a plurality of backing members can be manufactured simultaneously, the cost can be reduced.

Figure 14:
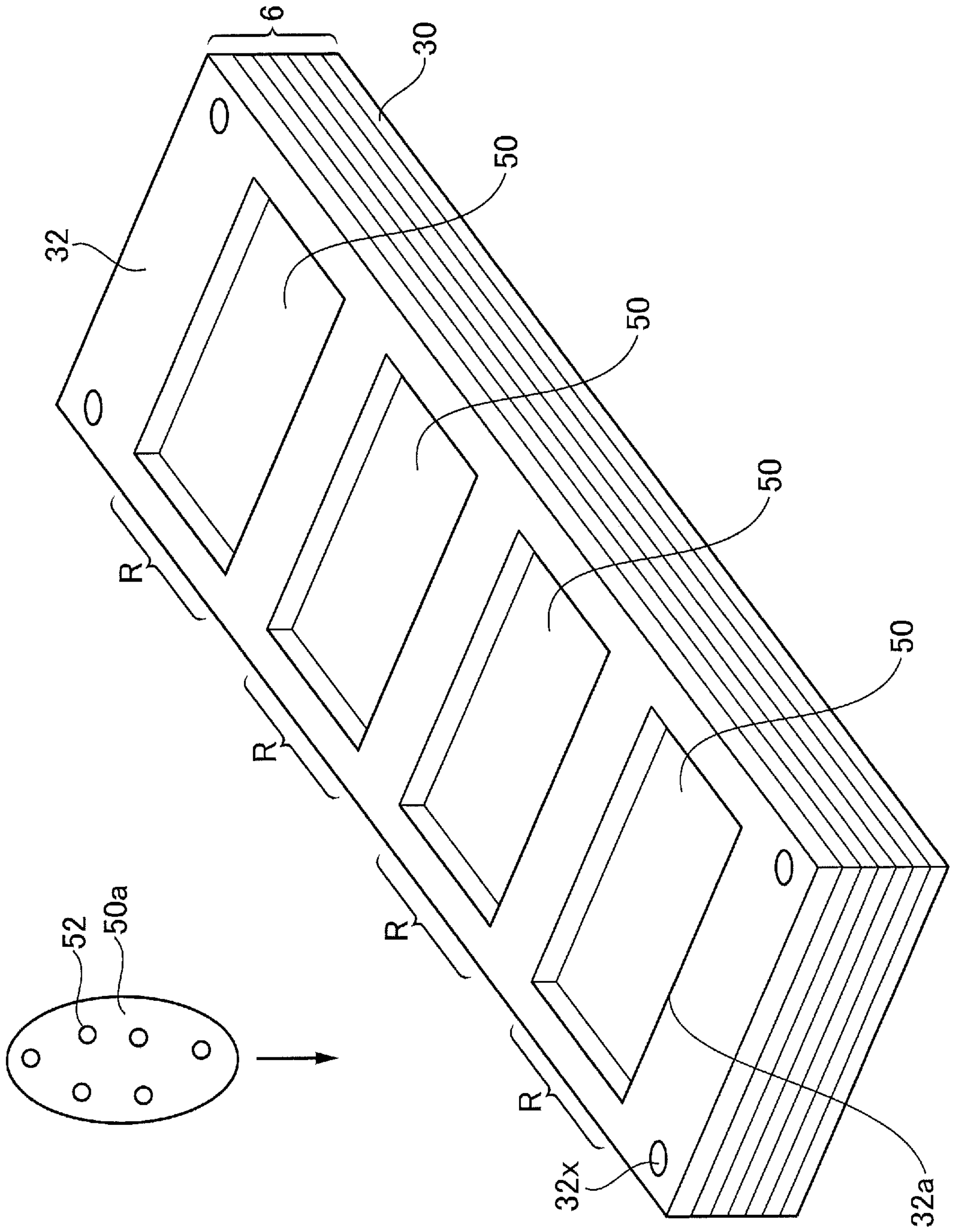
FIG. 14 is a diagram (part 8) illustrating the example of the process of manufacturing the backing member according to the first embodiment.

Next, as illustrated at a top left portion in FIG. 14, a resin 50*a* including the filler 52, is injected from the opening 32*a* of the upper support plate 32 into a hollow portion of the product region R in which the leads 20 of the lead frame 5 are laminated. Epoxy resins may preferably be used for the resin 50*a*.

The resin 50*a* is injected under vacuum, and bubbles generated during the injection of the resin 50*a* are removed by vacuum degassing. Thereafter, the resin 50*a* is cured by performing a heat treatment at a temperature of 150° C. for two hours, to obtain the resin layer 50. As a result, the large number of leads 20, arranged in both the horizontal and vertical directions, are embedded in the resin layer 50, in the plurality of product regions R.

In this state, the laminated leads 20 remain fixed by the resin layer 50 even when a pressing force applied to the laminated body 6, sandwiched between the lower support plate 30 and the upper support plate 32, is released. For this reason, the thickness of the laminated body 6 at the time when the pressure is applied to the laminated body 6 is maintained.

The filler 52 included in the resin layer 50 will now be described. In order for the resin layer 50 including the filler 52 to exhibit the function of achieving the scattering and absorption of the ultrasonic wave, a material having an acoustic impedance that greatly differs from an acoustic impedance of the resin layer 50, is used for the filler 52.

For this reason, a material with a high acoustic impedance, such as tungsten, alumina, or the like, or a material with a low acoustic impedance, such as hollow glass spheres, and resin materials such as urethane, silicone, or the like, may be used for the filler 52.

The acoustic velocity of a base material, such as epoxy resins or the like, is approximately 2000 m/s. In addition, a frequency of the ultrasonic wave is 2 MHz to 20 MHz, and low frequencies with small absorption are used in applications for diagnosing inner parts of the human body.

In a case where the frequency of the ultrasonic wave is 5 MHz, the wavelength is approximately 400 μm. When the grain diameter of the filler 52 approaches the wavelength, the reflection increases, thereby increasing the noise during the diagnosis. In contrast, when the grain diameter of the filler 52 is too small, a sufficient scattering of the ultrasonic wave does not occur. For this reason, it is desirable to set the grain diameter of the filler 52 to approximately ⅕ to approximately 1/10 of the wavelength of the ultrasonic wave.

Accordingly, in the case where the frequency of the ultrasonic wave is 5 MHz, an average grain diameter of the filler 52 is preferably set to approximately 40 μm to approximately 80 μm.

For example, in a case where the pitch at which the leads 20 arranged in the horizontal direction and the pitch at which the leads 20 arranged in the vertical direction are to be set to 200 μm, and the width and the thickness of the leads 20 are to be set to 60 μm, respectively, the spacing of the leads 20 becomes 140 μm. In this manner, the spacing between the adjacent leads 20 is set wider than the average grain diameter of the filler 52.

Hence, it is possible to uniformly inject the filler 52 in gaps along the horizontal direction and the vertical direction of the leads 20. For this reason, it is possible to construct a high-performance backing member that can sufficiently absorb the ultrasonic wave.

As described above, when the resin 50*a* including the filler 52 is injected into the product regions R of the laminated lead frames 5 in the process of FIG. 14, the filler 52 can be dispersed uniformly in the gaps along the horizontal direction and the vertical direction of the leads 20.

In a case where the frequency of the ultrasonic wave is relatively high, the spacing of the leads can be made narrower than in the example described above, since it is possible to use a filler having an average grain diameter smaller than the grain diameter of the filler 52 described above.

However, because of the grain diameter greatly varies during the manufacture of the filler, it is necessary to take into consideration the fact that the filler includes a considerable amount of grains having a grain diameter that is approximately two times the average grain diameter.

In recent years, the size reduction and increased layout density of the piezoelectric elements have progressed, and as a result, the pitch at which the leads are arranged tends to become narrower.

However, as described above, since the grain diameter of the filler included in the resin layer to prevent the noise caused by the reflection of the ultrasonic wave depends on the wavelength of the ultrasonic wave, the grain diameter of the filler cannot be reduced even when the pitch at which the leads are arranged (or interconnect pitch) is narrowed.

From this viewpoint, a large spacing of the leads 20 can be secured, by reducing the cross sectional area of the leads 20. Hence, it is possible to cope with the narrowing of the pitch at which the piezoelectric elements are arranged.

In addition, because the width and the thickness of the leads 20 are set small even when pitch at which the leads 20 are arranged is narrowed, the leads 20 are less likely to make contact with each other, and further, a stray capacitance between the leads 20 becomes smaller, thereby reducing a crosstalk.

Figure 15:
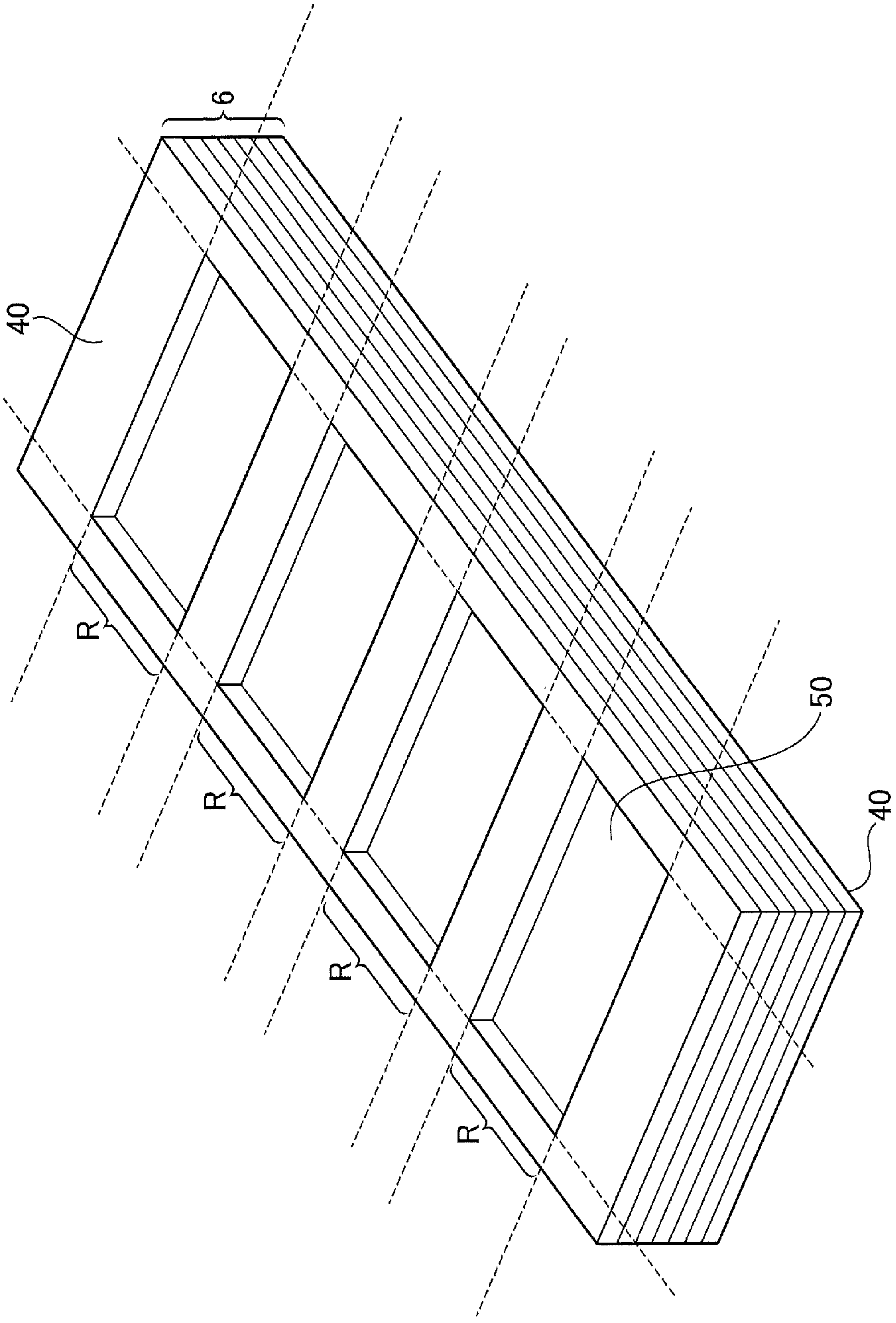
FIG. 15 is a diagram (part 9) illustrating the example of the process of manufacturing the backing member according to the first embodiment.

Next, as illustrated in FIG. 15, the lower support plate 30 and the upper support plate 32 are removed from the laminated body 6. In this state, since the upper surface of the lower support plate 30 is subjected to the fluororesin treatment, the lower support plate 30 can easily be stripped off from the resin layer 50.

Further, as illustrated by dotted lines in FIG. 15, the laminated body 6 is cut along the thickness direction thereof from the uppermost spacer 40 to the lowermost spacer 40, so that the product regions R in which the plurality of leads 20 are laminated are obtained.

Figure 16B:
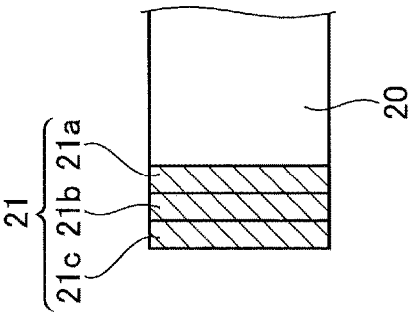
FIG. 16A and FIG. 16B are diagrams (part 10) illustrating the example of the process of manufacturing the backing member according to the first embodiment.
Figure 16A:
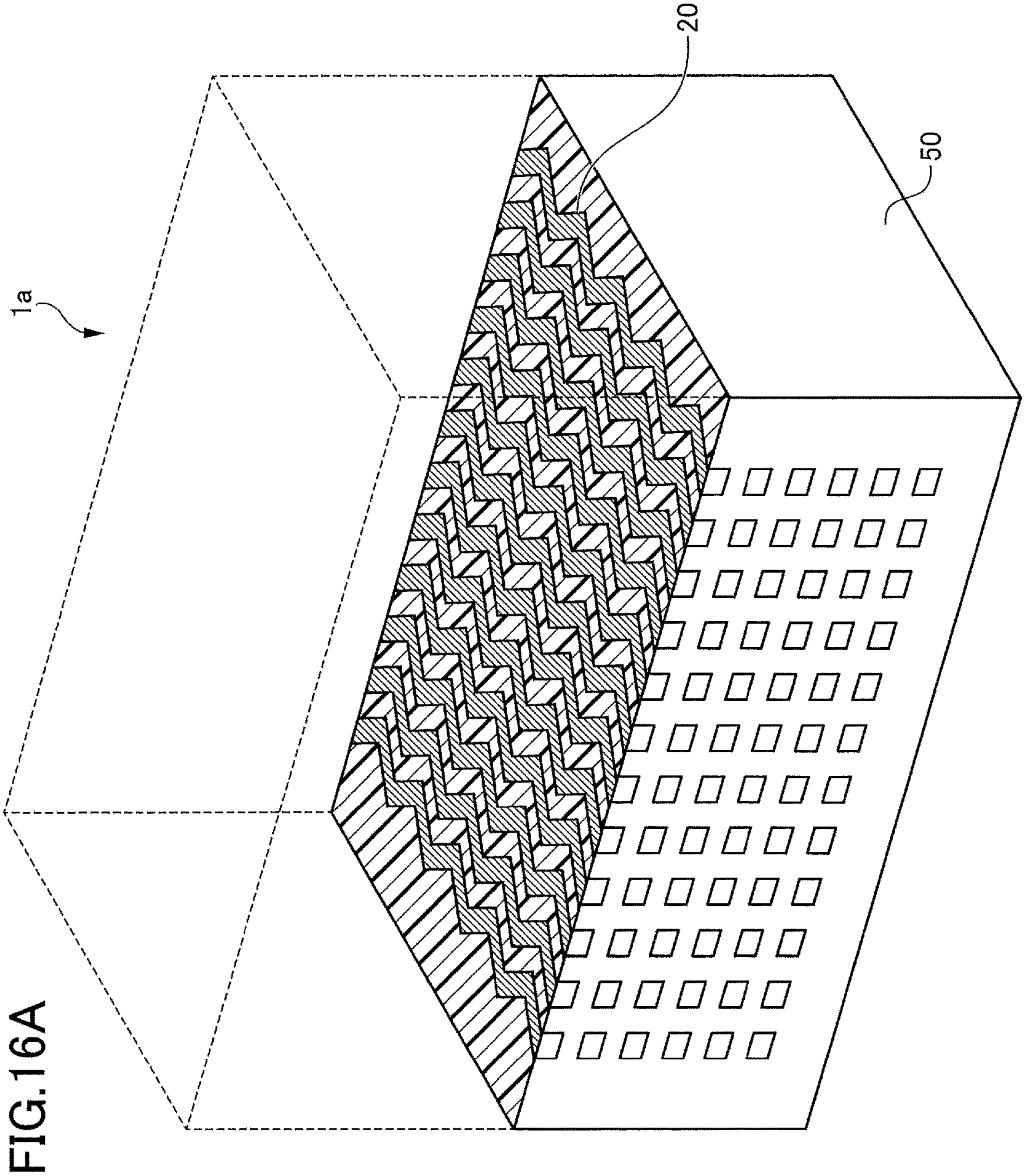

As illustrated in FIG. 16A, the region corresponding to the outer frame 14 of each lead frame 5 is removed from the laminated body 6, and the plurality of product regions R of the laminated body 6 are divided into individual laminated members 1*a*. In the laminated member 1*a*, each tip end surface on both sides of the lead 20 are exposed from the surfaces on both sides of the resin layer 50.

As illustrated in FIG. 16A, in the laminated member 1*a* immediately after cutting the laminated body 6 illustrated in FIG. 14, each lead 20 is arranged with an extending direction thereof facing the horizontal direction.

Thereafter, as illustrated in a partially enlarged cross sectional view of FIG. 16B, a contact layer 21 is famed on the tip end surfaces on both sides of the leads 20, exposed from the resin layer 50, by electroless plating or the like. The backing member 1 illustrated in FIG. 4 is completed in this manner.

For example, the contact layer 21 may have a multi-layer structure including a nickel (Ni) layer 21*a*, a palladium (Pd) layer 21*b*, a gold (Au) layer 21*c* that are laminated in this order starting from the tip end surface of the lead 20, as illustrated in FIG. 16B. For example, the thickness of the nickel layer 21*a* is 3 μm to 6 μm, the thickness of the palladium layer 21*b* is 0.1 μm, and the thickness of the gold layer 21*c* is 0.05 μm.

Modification of First Embodiment

A modification of the first embodiment illustrates an example in which the end portion of the lead is widened. In this modification of the first embodiment, a description of the same constituent elements as those of the first embodiment may be omitted.

Figure 17:
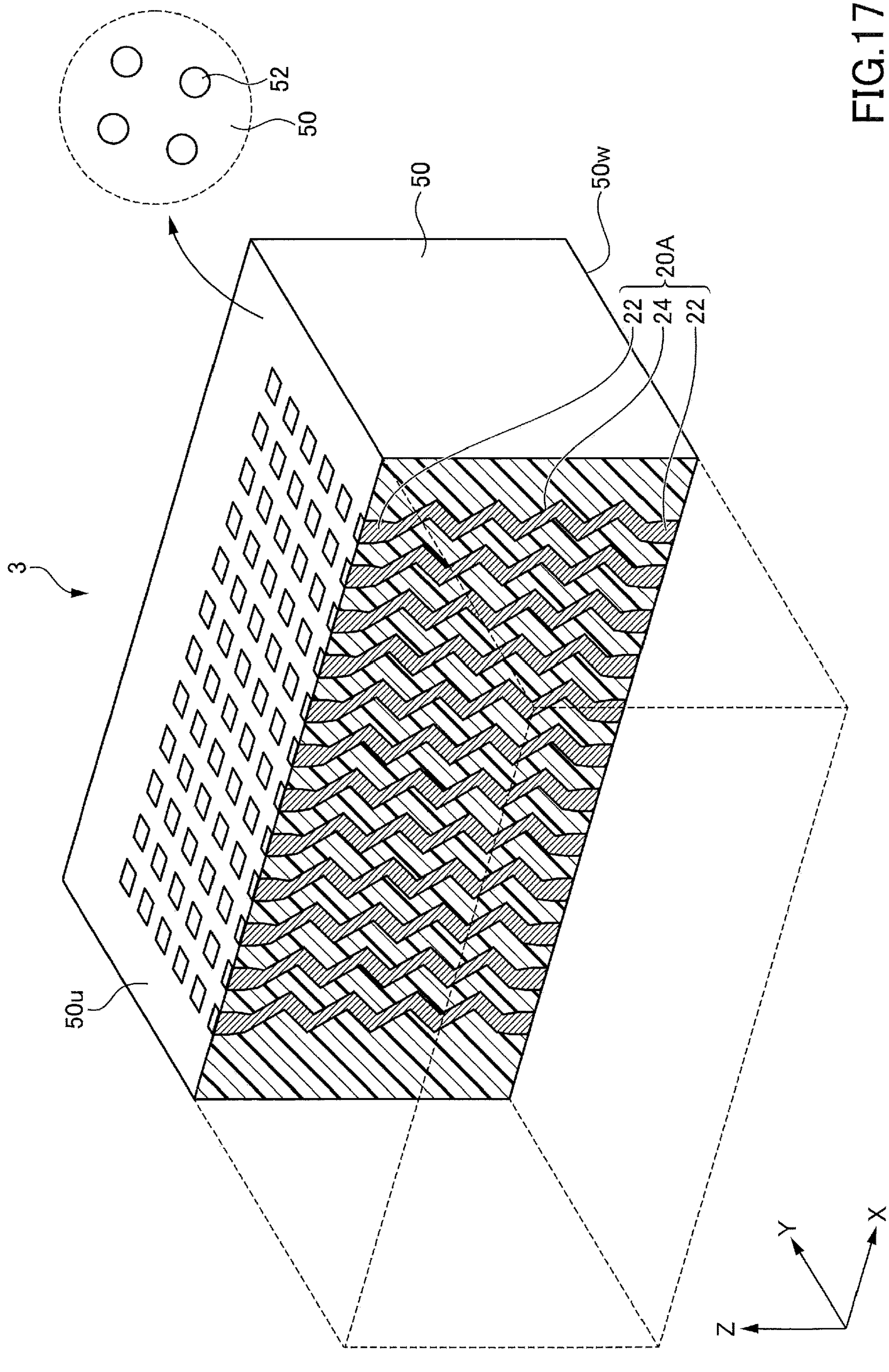
FIG. 17 is a cross sectional perspective view illustrating an example of the backing member according to a modification of the first embodiment.

FIG. 17 is a cross sectional perspective view illustrating the backing member according to the modification of the first embodiment. As illustrated in FIG. 17, a backing member 3 differs from the backing member 1 (refer to FIG. 4 or the like) in that the leads 20 are replaced with leads 20A.

The lead 20A includes an interconnect portion 24 arranged at a center portion along the longitudinal direction of the lead 20A, and terminal portions 22 connected to both ends of the interconnect portion 24, respectively.

Similar to the lead 20, the interconnect portion 24 of the lead 20A includes a metal material having the ultrasonic wave insulating property, and includes at least one bent portion or curved portion. Hence, the interconnect portion 24 of the lead 20A can insulate the noise in the ultrasonic wave, similar to the lead 20.

Figure 18A:
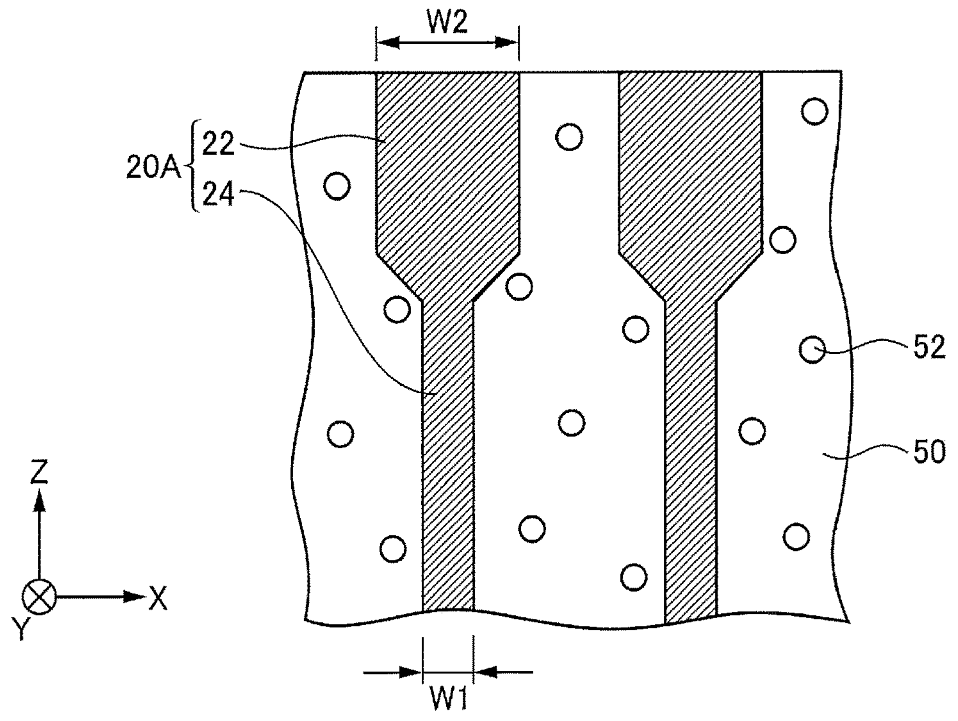
FIG. 18A and FIG. 18B are views in partial cross section for explaining cross sectional shapes of the leads for each direction according to the modification of the first embodiment.
Figure 18B:
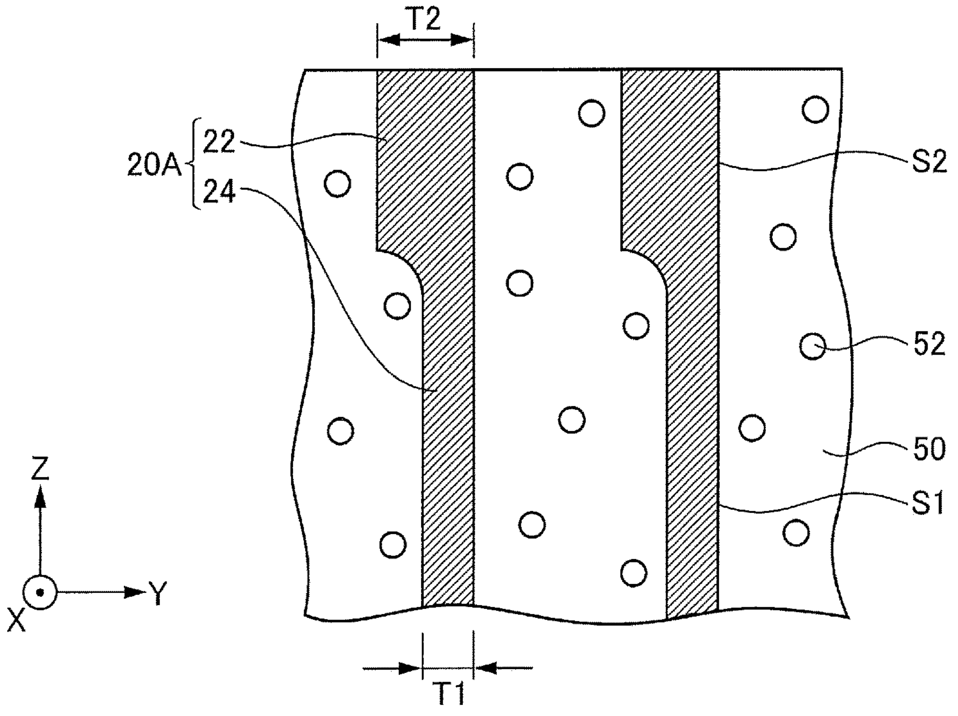

FIG. 18A is a partial enlarged cross sectional view of the lead 20A of FIG. 17, viewed from the Y-direction (front direction). FIG. 18B is a partial enlarged cross sectional view of the lead 20A of FIG. 17, viewed from the X-direction (lateral direction).

As illustrated in FIG. 18A, a width W1 of the interconnect portion 24 of the lead 20A is set smaller than a width W2 of the terminal portions 22. In addition, as illustrated in FIG. 18B, a thickness T1 of the interconnect portion 24 of the lead 20A is set smaller than a thickness T2 of the terminal portions 22.

Hence, the cross sectional area of the interconnect portion 24 of the lead 20A is set smaller than the cross sectional area of the terminal portions 22.

The cross sectional shape of the interconnect portion 24 of the lead 20A is a rectangular shape (refer to FIG. 20C to be described later), for example. In addition, the cross sectional shape of the terminal portion 22 is formed to a hexagonal shape with a projection arranged at a center on surfaces on both sides thereof (refer to FIG. 20B to be described later), for example.

The entire side surface of the upper terminal portion 22 of the lead 20A is embedded in the resin layer 50. The tip end surface of the upper terminal portion 22 of the lead 20A is exposed from the upper surface 50*u* of the resin layer 50. The tip end surface of the upper terminal portion 22 of the lead 20A coincides with the upper surface 50*u* of the resin layer 50.

Similarly, the entire side surface of the lower terminal portion 22 of the lead 20A is embedded in the resin layer 50. The tip end surface of the lower terminal portion 22 of the lead 20A is exposed from the lower surface 50*w* of the resin layer 50. The tip end surface of the terminal portion 22 of the lead 20A coincides with the lower surface 50*w* of the resin layer 50.

In addition, the interconnect portion 24 of the lead 20A is connected to a lower portion of the cross sectional area of the terminal portion 22 along the thickness direction (refer to FIG. 20C to be described later). Further, as illustrated in FIG. 18B, a lower surface S1 of the interconnect portion along the thickness direction coincides with a lower surface S2 of the terminal portion 22 along the thickness direction.

According to such a connection structure, the width and the thickness of the interconnect portion 24 are smaller than the width and the thickness of the terminal portions 22, respectively.

Moreover, because the cross sectional area of the terminal portion 22 of the lead 20A is sufficiently large, the piezoelectric element and the wiring board can be electrically connected to each other with a high reliability.

Further, in the backing member 3, the plurality of leads 20A are laminated with the lower surfaces S1 and S2, respectively along the thickness direction of the interconnect portion 24 and the terminal portions 22, facing the same direction, as illustrated in FIG. 18B.

According to such a laminated structure of the leads 20A, it is possible to most uniformly disperse the filler 52 in the regions between the plurality of leads 20A.

However, structures other than the laminated structure of the leads 20A described above may be employed. For example, in the Y-direction of the leads 20A of FIG. 17, the plurality of leads 20A may be laminated so that the lower surfaces S1 and S2 (FIG. 18B), respectively along the thickness direction of the interconnect portion 24 and the terminal portions 22 of each lead 20A, oppose the lower surfaces S1 and S2 of the adjacent lead 20A.

In this example, when laminating the lead frames 5 in the process of FIG. 10 described above, the plurality of leads 20A may be laminated so that the lower surfaces S1 and S2, respectively along the thickness direction of the interconnect portion 24 and the terminal portions 22 of each lead 20A, oppose the lower surfaces S1 and S2 of the adjacent lead 20A, among the lead frames 5.

Accordingly, by employing the leads 20A, the filler 52 can be arranged between the adjacent leads 20A, regardless of the laminated structure of the leads 20A, thereby improving the performance of scattering and absorption of the ultrasonic wave as compared to the conventional technique.

Moreover, in the example of FIG. 17, the arrangement of the leads 20A in the X-direction include each of the leads 20A having the linear shape arranged in parallel, however, the arrangement of the leads 20A in the X-direction may include each of the leads 20A having a fan shape to convert the pitch at which the leads 20A are arranged. When forming the lead frame 5 of FIG. 9 described above, each lead 20A may be formed in the fan shape, and various lead patterns having shapes other than the fan shape may easily be formed.

Similarly, in the example of FIG. 17, the arrangement of the leads 20A in the Y-direction of each lead 20A include each of the leads 20A having the linear shape arranged in parallel, however, the arrangement of the leads 20A in the Y-direction may convert the pitch at which the leads 20A are arranged.

In this case, when applying the pressure on the laminated body 6 of FIG. 11 described above, the pitch at which the leads 20A are arranged on one end and the other end along the Y-direction can be changed, by forming the shapes of the side surfaces of the lower support plate 30 and the upper support plate 32, respectively, to tapered shapes having different thicknesses between the one end and the other end.

In the example of FIG. 17, the width and the thickness of the interconnect portion 24 of the lead 20A are set smaller than the width and the thickness of the terminal portions 22 on both sides of the interconnect portion 24, respectively. Alternatively, the width and the thickness of the interconnect portion 24 of the lead 20A may be set smaller than the width and the thickness of at least one of the terminal portions 22 on both sides of the interconnect portion 24, respectively, according to the various forms of connection employed by the backing member.

For example, the width and the thickness of the interconnect portion 24 of the lead 20A may be set smaller than the width and the thickness of the upper terminal portion 22, respectively, and the width and the thickness of the lower terminal portion 22 may be set the same as the width and the thickness of the interconnect portion 24, respectively.

Figure 19A:
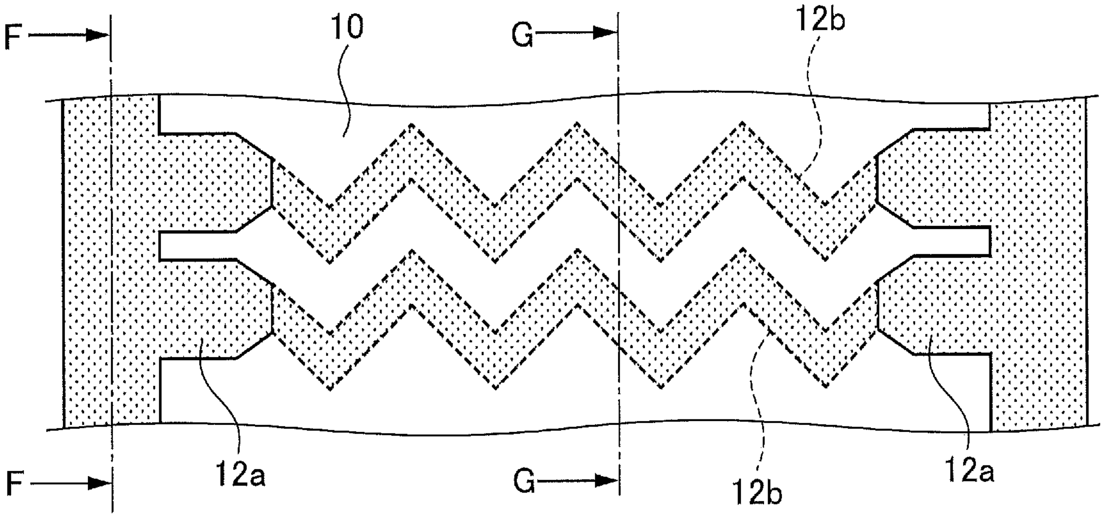
FIG. 19A, FIG. 19B, and FIG. 19C are diagrams (part 1) illustrating an example of the process of manufacturing the backing member according to the modification of the first embodiment.

In order to manufacture the leads 20A, the arrangement of the first resist layer 12*a* and the second resist layer 12*b* during the process of FIG. 7A through FIG. 7C described above, may be changed as illustrated in FIG. 19A through FIG. 19C. FIG. 19A is a plan view of the metal plate 10, FIG. 19B is a cross sectional view along a line F-F in FIG. 19A, and FIG. 19C is a cross sectional view along a line G-G in FIG. 19A.

Figure 19B:
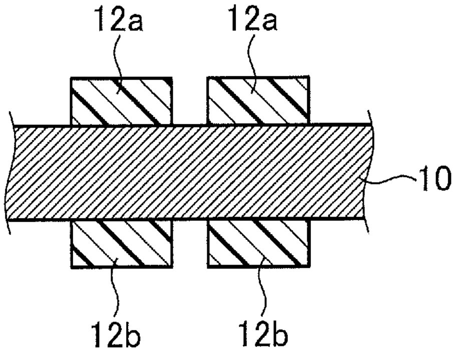

In other words, as illustrated in the plan view of FIG. 19A and the cross sectional view of FIG. 19B, the first resist layer 12*a*, formed on the upper surface of the metal plate 10, is formed with a pattern corresponding only to the outer frame and the terminal portions at both ends of the leads connected to the outer frame. At the upper surface of the metal plate 10, the first resist layer 12*a* is not formed in the region where the interconnect portion of each lead is to be arranged, and the first resist layer 12*a* has an opening that is formed in one-shot in this region where the interconnect portion of each lead is to be arranged.

Figure 19C:
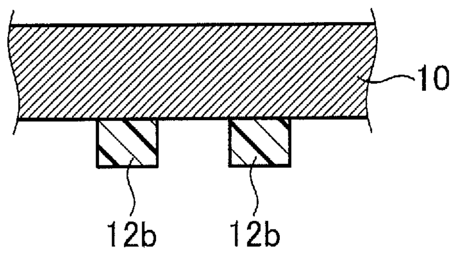

On the other hand, as illustrated in the plan view of FIG. 19A and the cross sectional view of FIG. 19C, the second resist layer 12*b*, formed on the lower surface of the metal plate 10, is formed with a pattern corresponding to the entirety of the outer frame and the leads connected to the outer frame.

In contrast to the example illustrated in FIG. 19A through FIG. 19C, the first resist layer 12*a* may be formed on the lower surface of the metal plate 10, and the second resist layer 12*b* may be formed on the upper surface of the metal plate 10. In other words, the first resist layer 12*a* may be formed on one surface of the metal plate 10, and the second resist layer 12*b* may be formed on the other surface of the metal plate 10.

Figure 20A:
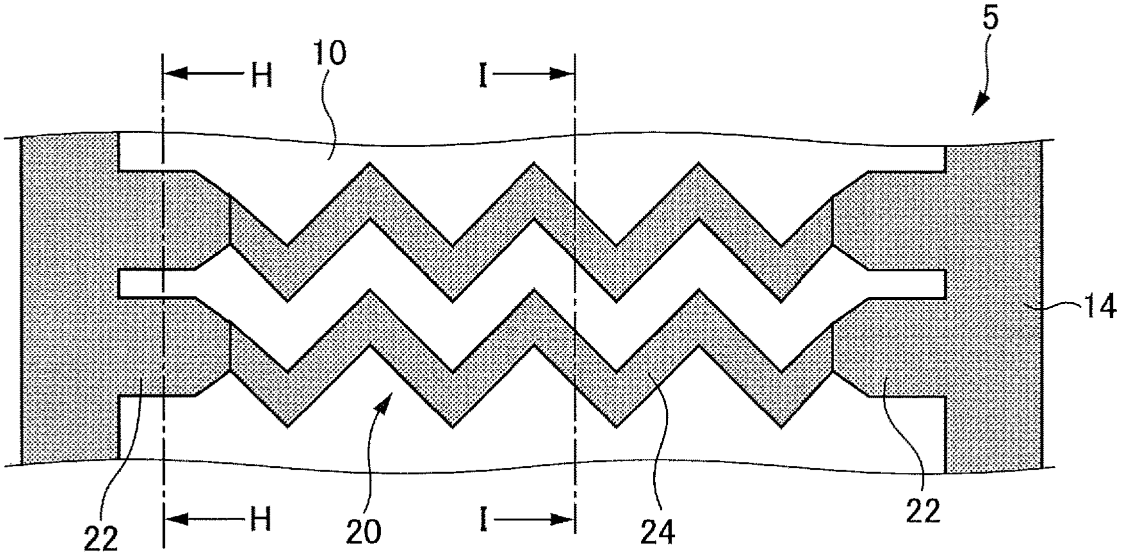
FIG. 20A, FIG. 20B, and FIG. 20C are diagrams (part 2) illustrating the example of the process of manufacturing the backing member according to the modification of the first embodiment.
Figure 20B:
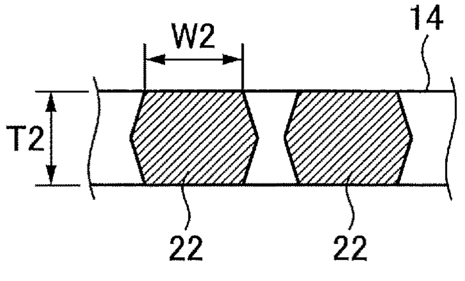
Figure 20C:
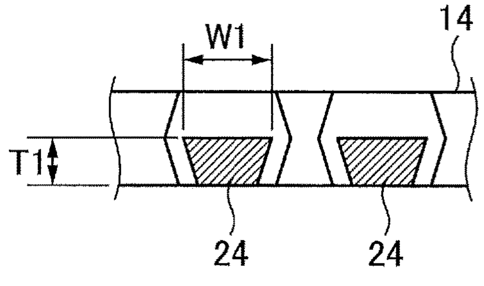

Next, as illustrated in FIG. 20A, FIG. 20B, and FIG. 20C, the metal plate 10 is etched by a wet etching from the upper surface and the lower surface of the metal plate 10, using the first resist layer 12*a* and the second resist layer 12*b* as masks, respectively, and the first resist layer 12*a* and the second resist layer 12*b* are thereafter removed. The wet etching and the etchant used therefor may be similar to those used in the first embodiment. FIG. 20A is a plan view of the metal plate 10, FIG. 20B is a cross sectional view along a line H-H in FIG. 20A, and FIG. 20C is a cross sectional view along a line I-I in FIG. 20A.

During the etching, the etching rate can be adjusted on the side of the upper surface and on the side of the lower surface of the metal plate 10, by adjusting the spray pressure or the like of the spray etching. In the example illustrated in FIG. 20A through FIG. 20C, the etching rate on the side of the upper surface of the metal plate 10 is set high, so that the thickness of the interconnect portion 22 of the lead 20A is less than one-half the thickness of the terminal portion 22 of the lead 20A.

The lead frame 5 in which the plurality of leads 20A are connected to the outer frame 14, can be obtained by the method described above. The lead 20A is formed with the interconnect portion 24 arranged at the center portion thereof, and the terminal portions 22 connecting to the respective ends of interconnect portion 24. The terminal portions 22 on both sides of the lead 20A, in the state connected to the outer frame 14.

The width W1 of the interconnect portion 24 of the lead 20A is set smaller than the width W2 of the terminal portions 22. In addition, the thickness T1 of the interconnect portion 24 of the lead 20A is set smaller than the thickness T2 of the terminal portions 22.

In this manner, the cross sectional area of the interconnect portion 24 of the lead 20A can be set smaller than the cross sectional area of the terminal portions 22.

As illustrated in the cross sectional view of FIG. 20B, the cross sectional shape of the terminal portions 22 of the lead 20A, is formed to the hexagonal shape with the projection arranged at the center on the surfaces on both sides thereof, for example. In addition, as illustrated in the cross sectional view of FIG. 200, the cross sectional shape of the interconnect portion 24 of the lead 20A, is formed to the rectangular shape similar to the trapezoidal shape.

Similar to the first embodiment, this modification employs the method of forming the leads 20A by a single wet etching from both the upper and lower surfaces (on both sides) of the metal plate 10, to penetrate the metal plate 10.

For this reason, as illustrated in FIG. 20C, the interconnect portion 24 connects to a lower portion along the thickness direction within the cross section of each terminal portion 22, and the lower surface of the interconnect portion 24 along the thickness direction thereof coincides with the lower surface of the terminal portion 22 along the thickness direction thereof. Hence, the interconnect portion 24 is arranged at a position deviated toward one end (lower side) from the center within the cross section of the terminal portion 22.

For example, the width W1 of the interconnect portion 24 is approximately 40 μm to approximately 80 μm, for example. In addition, the thickness T1 of the interconnect portion 24 is approximately 40 μm to approximately 80 μm, for example. Moreover, the width W2 of the terminal portion 22 is approximately 150 μm to approximately 200 μm, for example. Furthermore, the thickness T2 of the terminal portion 22 is approximately 150 μm to approximately 200 μm, for example. The pitch of the interconnect portions 24 of the leads 20A is approximately 100 μm to approximately 300 μm, for example.

Although the preferred embodiments have been described in detail above, various variations, modifications, and substitutions may be made to the embodiments and modifications described above without departing from the scope of the present invention.

For example, in the example of the embodiments described above, the lead includes the bent portion or curved portion when viewed from one direction (for example, the Y-direction in FIG. 4). However, the present invention is not limited to this example, and the lead may include the bent portion or curved portion when viewed from one direction (for example, the Y-direction in FIG. 4), and include the bent portion or curved portion when viewed from another direction (for example, the X-direction in FIG. 4) perpendicular to the one direction, so that the bent portion or curved portion of the lead is formed three-dimensionally. For example, in the state illustrated in FIG. 9, the lead frame 5 may be partially pressed from a direction perpendicular to the paper surface, to form the lead including the three-dimensionally formed bent portion or curved portion. In this case, it is possible to further insulate the noise in the ultrasonic wave.

In addition, by forming the lead to a spiral shape, it is possible to form the lead including the three-dimensionally formed bent portion or curved portion. For example, a three-dimensional (3D) printer may be used to form the leads to the spiral shape.

Accordingly to each of the embodiments and modifications described above, it is possible to provide a backing member and an ultrasonic probe, which can reduce noise in an ultrasonic wave transmitted from a piezoelectric element.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A backing member comprising:

a resin layer having a first surface, and a second surface opposite to the first surface; and a plurality of linear conductors, embedded in the resin layer, and penetrating the resin layer from the first surface to the second surface, wherein each of the plurality of linear conductors includes a metal material having an ultrasonic wave insulating property, and wherein each of the plurality of linear conductors includes an interconnect portion, arranged at a center portion along a longitudinal direction of each of the plurality of linear conductors, and a pair of terminal portions, located at mutually opposing positions on an imaginary straight line parallel to the longitudinal direction, and connected to respective ends of the interconnect portion, wherein each pair of two mutually adjacent interconnect portions of the plurality of linear conductors includes a first interconnect portion having a first pattern, and a second interconnect portion having a second pattern identical to the first pattern and making no contact with the first interconnect portion, wherein each of the first pattern and the second pattern is a repeating pattern of a plurality of bent portions or curved portions having the same pattern repeated multiple times continuously along the longitudinal direction, so that a convex region of each bent portion or curved portion of the first pattern protrudes into a concave region of each bent portion or curved portion of the second pattern, and a convex region of each bent portion or curved portion of the second pattern protrudes into a concave region of each bent portion or curved portion of the first pattern, and wherein a spacing between the first interconnect portion and the second interconnect portion of the two mutually adjacent interconnect portions in each pair of two mutually adjacent interconnect portions, including the bent portions or curved portions of the first pattern and the second pattern, is approximately constant throughout an entire length of the two mutually adjacent interconnect portions in each pair of two mutually adjacent interconnect portions of the plurality of linear conductors.

2. The backing member as claimed in claim 1, wherein each of the first pattern and the second pattern has one of a zigzag shape, a wave shape, and a sawtooth shape.

3. The backing member as claimed in claim 1, wherein the metal material includes at least one element selected from a group consisting of tungsten, gold, platinum, palladium, and ruthenium.

4. The backing member as claimed in claim 3, further comprising:

a plated film including tungsten formed on a surface of each of the plurality of linear conductors.

5. The backing member as claimed in claim 4, wherein the plated film is a nickel-tungsten plated film.

6. The backing member as claimed in claim 3, wherein each of the plurality of linear conductors is made of a material including tungsten.

7. An ultrasonic probe comprising:

a backing member including a resin layer having a first surface, and a second surface opposite to the first surface, and a plurality of linear conductors, embedded in the resin layer, and penetrating the resin layer from the first surface to the second surface, wherein each of the plurality of linear conductors includes a metal material having an ultrasonic wave insulating property, wherein each of the plurality of linear conductors includes an interconnect portion, arranged at a center portion along a longitudinal direction of each of the plurality of linear conductors, and a pair of terminal portions, located at mutually opposing positions on an imaginary straight line parallel to the longitudinal direction, and connected to respective ends of the interconnect portion, wherein each pair of two mutually adjacent interconnect portions of the plurality of linear conductors includes a first interconnect portion having a first pattern, and a second interconnect portion having a second pattern identical to the first pattern and making no contact with the first interconnect portion, wherein each of the first pattern and the second pattern is a repeating pattern of a plurality of bent portions or curved portions having the same pattern repeated multiple times continuously along the longitudinal direction, so that a convex region of each bent portion or curved portion of the first pattern protrudes into a concave region of each bent portion or curved portion of the second pattern, and a convex region of each bent portion or curved portion of the second pattern protrudes into a concave region of each bent portion or curved portion of the first pattern, and wherein a spacing between the first interconnect portion and the second interconnect portion of the two mutually adjacent interconnect portions in each pair of two mutually adjacent interconnect portions, including the bent portions or curved portions of the first pattern and the second pattern, is approximately constant throughout an entire length of the two mutually adjacent interconnect portions in each pair of two mutually adjacent interconnect portions of the plurality of linear conductors;

a piezoelectric element, arranged on the backing member, and electrically connected to each of the plurality of linear conductors; and an acoustic adjustment layer arranged on the piezoelectric element.

8. The ultrasonic probe as claimed in claim 7, wherein each of the first pattern and the second pattern of the backing member has one of a zigzag shape, a wave shape, and a sawtooth shape.

9. The ultrasonic probe as claimed in claim 7, wherein the metal material includes at least one element selected from a group consisting of tungsten, gold, platinum, palladium, and ruthenium.

10. The ultrasonic probe as claimed in claim 9, wherein the backing member further includes a plated film including tungsten formed on a surface of each of the plurality of linear conductors.

11. The ultrasonic probe as claimed in claim 10, wherein the plated film of the backing member is a nickel-tungsten plated film.

12. The ultrasonic probe as claimed in claim 9, wherein each of the plurality of linear conductors of the backing member is made of a material including tungsten.

13. The backing member as claimed in claim 1, wherein the interconnect portion has a uniform width and a uniform thickness between the pair of terminal portions.

14. The backing member as claimed in claim 1, wherein one of the pair of terminal portions of each of the plurality of linear conductors has a width and a thickness greater than a width and a thickness of the interconnect portion, respectively, and the other of the pair of terminal portions has a width and a thickness greater than or equal to the width and the thickness of the interconnect portion, respectively.

15. The ultrasonic probe as claimed in claim 7, wherein the interconnect portion of each of the plurality of linear conductors has a uniform width and a uniform thickness between the pair of terminal portions.

16. The ultrasonic probe as claimed in claim 7, wherein one of the pair of terminal portions of each of the plurality of linear conductors has a width and a thickness greater than a width and a thickness of the interconnect portion of each of the plurality of linear conductors, respectively, and the other of the pair of terminal portions of each of the plurality of linear conductors has a width and a thickness greater than or equal to the width and the thickness of the interconnect portion of each of the plurality of linear conductors, respectively.

17. The backing member as claimed in claim 1, wherein the resin layer includes a filler selected from a group consisting of tungsten, alumina, hollow glass spheres or balloons, and resin materials, and the spacing is wider than an average grain diameter of the filler.

18. The ultrasonic probe as claimed in claim 7, wherein the resin layer of the backing member includes a filler selected from a group consisting of tungsten, alumina, hollow glass spheres or balloons, and resin materials, and the spacing is wider than an average grain diameter of the filler.

* * * * *